United States Patent
Jenniges et al.

(10) Patent No.: US 7,200,571 B1
(45) Date of Patent: Apr. 3, 2007

(54) COMPUTERIZED AUCTION SYSTEM FOR USE WITH MULTIPLE PURCHASING MEDIA

(75) Inventors: Joseph C. Jenniges, Eden Prairie, MN (US); John M. Jack, Wayzata, MN (US); Stephanie A. Binzen, Minnetonka, MN (US)

(73) Assignee: Schoeneckers, Inc., Minneapolis, MN (US)

(*) Notice: Subject to any disclaimer, the term of this patent is extended or adjusted under 35 U.S.C. 154(b) by 1265 days.

(21) Appl. No.: 09/637,728

(22) Filed: Aug. 11, 2000

Related U.S. Application Data

(60) Provisional application No. 60/155,282, filed on Sep. 21, 1999.

(51) Int. Cl.
*G06F 17/60* (2006.01)

(52) U.S. Cl. ............... 705/37; 705/14; 705/10

(58) Field of Classification Search ............ 705/28–37, 705/39–45, 10–40
See application file for complete search history.

(56) References Cited

U.S. PATENT DOCUMENTS

| | | | |
|---|---|---|---|
| 4,789,928 A | 12/1988 | Fujisaki | 364/401 |
| 5,243,515 A | 9/1993 | Lee | 364/401 |
| 5,890,138 A | 3/1999 | Godin et al. | |
| 6,178,408 B1 * | 1/2001 | Copple et al. | 705/14 |
| 6,829,586 B2 | 12/2004 | Postrel | 705/14 |

FOREIGN PATENT DOCUMENTS

| | | | |
|---|---|---|---|
| GB | 2315579 A | | 4/1998 |
| WO | WO 92/15174 | * | 9/1992 |
| WO | WO 99/27476 | | 6/1999 |

OTHER PUBLICATIONS

New Offers in Frequent Flier Plans, St. Louis Post Dispatch, Sep. 26, 1989, Edition 3S, Section DOLLARS/SENSE, p. 5D.*
Communication from Canadian Patent Examiner Nasrallah regarding previously-cited reference: "Fairmarket-Online Auction Promotions", http://www.fairmarket.com/new_solutions.html, 4 pgs.
"Hinda Incentives-Incentive Points Based e-Auction", http://www.hinda.com/TECHNOLOGY/e_Auction.html, Hinda Incentives, 2 pgs.
"Yahoo-Yahoo Points; How do I Claim my Auction Prize", http://help.yahoo.com/help/us/points/points-15.html, Yahoo! Inc., 1 pg.

* cited by examiner

*Primary Examiner*—Frantzy Poinvil
(74) *Attorney, Agent, or Firm*—Moss & Barnett, P.A.

(57) ABSTRACT

Systems and methods create and maintain an auction server operative to receive requests for displaying auction items. The bid values are displayed and received in units that are specific to a particular program in which the user is participating. Bid values can be displayed and received in differing units depending on the particular program. Thus, participants in different programs can bid on the same items using different media types or different currencies. The system automatically converts between the different media types in order to determine highest bidders and bid amounts.

12 Claims, 23 Drawing Sheets

FIG. 12B

COMPUTERIZED AUCTION SYSTEM FOR USE WITH MULTIPLE PURCHASING MEDIA

CLAIM OF PRIORITY

This application claims the benefit of U.S. Provisional Application Ser. No. 60/155,282, filed Sep. 21, 1999 under 35 U.S.C. 119(e).

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright© 1999, 2000, BI® is a tradename of Schoeneckers, Inc. All Rights Reserved.

FIELD OF THE INVENTION

The present invention relates generally to computerized auction systems, and more particularly to a computerized auction system recognizing multiple purchasing media.

BACKGROUND

Literally millions of people are flocking to hundreds of auction sites to hunt for treasures and bargains. The worldwide web has over 170 auction sites from general interest to very specifically focused sites featuring items like coins, baskets or marine items. In a typical auction web site, items are put up for bidding over a defined period of time. The person (or persons depending on the auction type) submitting the highest bid can then purchase the item at the bid price. In previous systems, the bidding data such as the current high bid, the reserve price etc. have been expressed in terms of a single currency, typically United States dollars.

However, there are many other mediums of exchange. One example is the incentive program. Incentive programs are typically offered by sponsoring organizations to promote the sales of their products or services, or to improve another measure of performance of participating employees and independent contractors of the sponsor. Incentive programs are also known as "promotions." Participants can receive credits in the form of a reward media that are accumulated and can be exchanged for merchandise and/or services.

A disadvantage of auction web sites is that the user cannot redeem incentive program reward media, such as frequent buyer points at these sites. A further disadvantage is that the bid and sale amounts are displayed in a single currency to all users, regardless of the type of media they may hold.

Therefore, there is a need in the art for a system that can provide auction web services that can use multiple media types. Furthermore, the system should be able to limit access to those who participate in sponsoring organizations' programs.

SUMMARY

The above-mentioned shortcomings, disadvantages and problems are addressed by the present invention, which will be understood by reading and studying the following specification.

The systems and methods illustrated create and maintain an auction server operative to receive requests for displaying the auction items. The bid values are displayed and received in units that are specific to a particular program in which the user is participating. Bid values can be displayed and received in differing units depending on the particular program. Thus, participants in different programs can bid on the same items using different media types or different currencies. The system automatically converts between the different media types in order to determine highest bidders and bid amounts.

The present invention describes systems, clients, servers, methods, and computer-readable media of varying scope. In addition to the aspects and advantages of the present invention described in this summary, further aspects and advantages of the invention will become apparent by reference to the drawings and by reading the detailed description that follows.

BRIEF DESCRIPTION OF THE DRAWINGS

FIGS. 12A–12D illustrate exemplary item bid pages according to an embodiment of the invention.

DETAILED DESCRIPTION OF THE INVENTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the scope of the present invention. The following detailed description is, therefore, not to be taken in a limiting sense.

Hardware and Operating Environment

Figure 1:
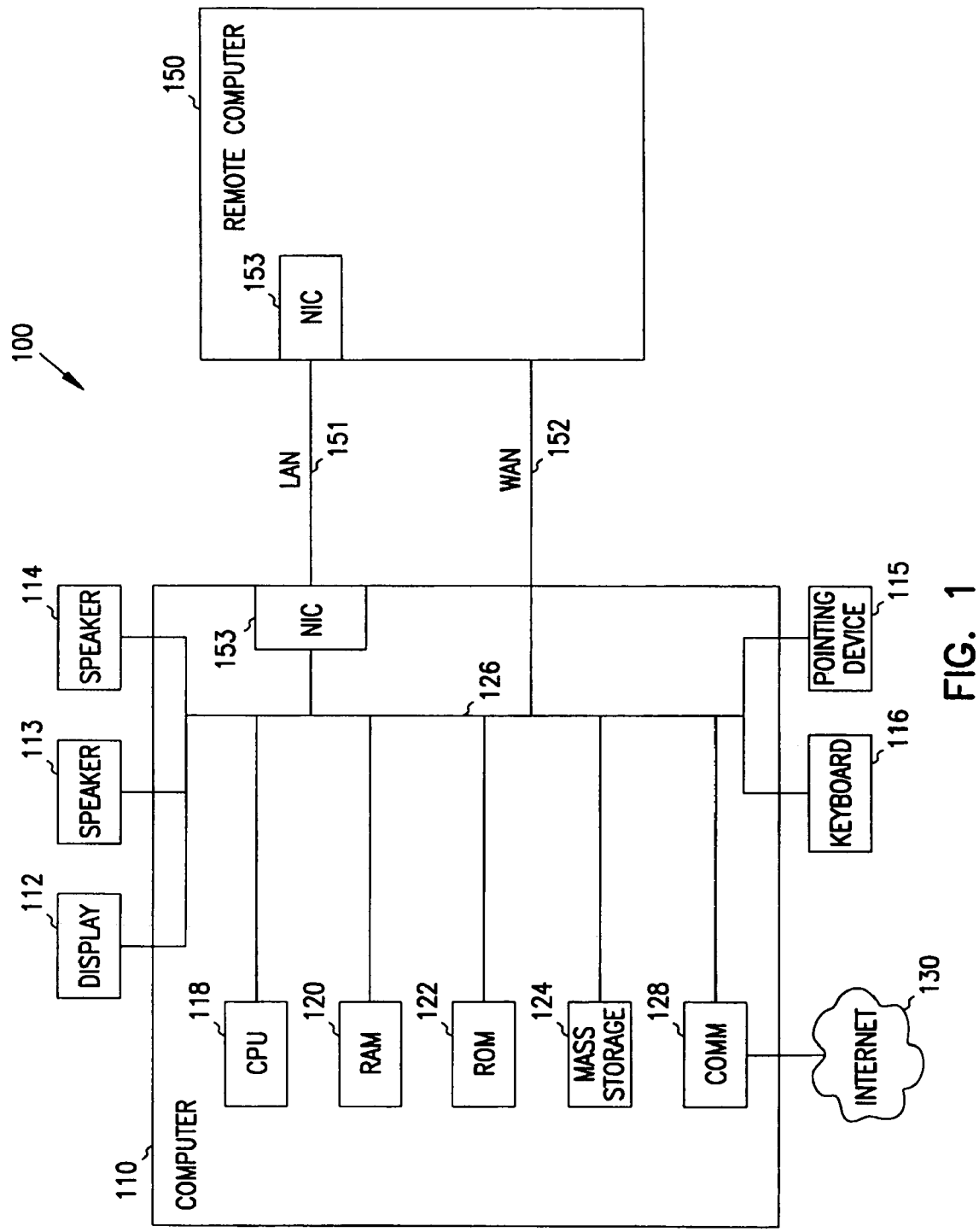
FIG. 1 is a block diagram of the hardware and operating environment in which different embodiments of the invention can be practiced.

FIG. 1 is a block diagram of the hardware and operating environment 100 in which different embodiments of the invention can be practiced. The description of FIG. 1 provides an overview of conventional computer hardware and a suitable computing environment in conjunction with which the invention can be implemented. The invention is described in terms of a computer executing computer-executable instructions. However, the invention can be embodied entirely in computer hardware in which the computer-executable instructions are implemented in read-only memory. The invention can also be implemented in client/server computing environments where remote devices that are linked through a communications network perform tasks. Program modules can be located in both local and remote memory storage devices in a distributed computing environment.

Computer 110 is operatively coupled to display device 112, pointing device 115, and keyboard 116. Computer 110 includes a processor 118 (e.g. an Intel Pentium processor), random-access memory 120 (RAM), read-only memory 122 (ROM), and one or more mass storage devices 124, and a system bus 126, that operatively couples various system components including the system memory to the processing unit 118. Mass storage devices are more specifically types of nonvolatile storage media and can include a hard disk drive, a floppy disk drive, an optical disk drive, and a tape cartridge drive. The memory 120, 122, and mass storage devices, 124, are types of computer-readable media. A user can enter commands and information into the personal computer 110 through input devices such as a pointing device 115 and a keyboard 116. Other input devices (not shown) can include a microphone, joystick, game pad, satellite dish, scanner, or the like. The processor 118 executes computer programs stored on the computer-readable media. In one embodiment of the invention, components of the system run on computer systems made by Sun Microsystems running the UNIX operating system. However, the invention is not limited to any particular type of computer 110. Computer 110 can be a PC-compatible computer, a MacOS-compatible computer or a UNIX-compatible computer. The construction and operation of such computers are well known within the art.

Furthermore, computer 110 can be communicatively connected to the Internet via a communication device 128. Internet 130 connectivity is well known within the art. In one embodiment, the computer includes a communication device that is a modem and corresponding communication drivers to connect to the Internet via what is known in the art as a "dial-up connection." In another embodiment, the computer includes a communication device that is an Ethernet or similar hardware (network) card connected to a local-area network (LAN) that itself is connected to the Internet via what is know in the art as a "direct connection" (e.g., T1 line, etc.).

Computer 110 also has at least one operating environment running thereon, each desirably providing a graphical user interface including a user-controllable pointer. Such operating environments include operating systems such as versions of the UNIX operating system. In alternative embodiments of the invention, the Microsoft Windows and Apple MacOS operating systems can be used. The invention is not limited to any particular operating environment, however, and the construction and use of such operating environments are well known within the art. Computer 110 desirably can have at least one web browser application program running within at least one operating environment, to permit users of computer 110 to access intranet or Internet world-wide-web pages as addressed by Universal Resource Locator (URL) addresses. Such browser application programs include Netscape Navigator and Microsoft Internet Explorer.

Display device 112 permits the display of information, including computer, video and other information, for viewing by a user of the computer. The invention is not limited to any particular display device 112. Such display devices include cathode ray tube (CRT) displays (monitors), as well as flat panel displays such as liquid crystal displays (LCD's). Display device is connected to the system bus 126. In addition to the monitor, computers typically include other peripheral output devices such as printers (not shown), speakers, pointing devices and a keyboard. Speakers 113 and 114 enable the audio output of signals. Speakers 113 and 114 are also connected to the system bus 126. Pointing device 115 permits the control of the screen pointer provided by the graphical user interface (GUI) of operating systems such as versions of Microsoft Windows. The invention is not limited to any particular pointing device 115. Such pointing devices include mouses, touch pads, trackballs, remote controls and point sticks. Finally, keyboard 116 permits entry of textual information into computer 110, as known within the art, and the invention is not limited to any particular type of keyboard.

The computer 110 can operate in a networked environment using logical connections to one or more remote computers, such as remote computer 150. These logical connections are achieved by a communication device coupled to or a part of the computer 110; the invention is not limited to a particular type of communications device. The remote computer 150 can be another computer 110, a server, a router, a network PC, a client, a peer device or other common network node. The logical connections depicted in FIG. 1 include a local-area network (LAN) 151 and a wide-area network (WAN) 152. Such networking environments are commonplace in offices, enterprise-wide computer networks, intranets and the Internet.

When used in a LAN-networking environment, the computer 110 and remote computer 150 are connected to the local network 151 through a network interface or adapter 153, which is one type of communications device. When used in a conventional WAN-networking environment, the computer 110 and remote computer 150 communicate with a WAN 152 through modems (not shown). The modem, which can be internal or external, is connected to the system bus 126. In a networked environment, program modules depicted relative to the personal computer 110, or portions thereof, can be stored in the remote memory storage device.

Software Environment

The embodiments of the invention described below operate in the context of one or more auction programs. An auction program is part of an incentives reward program, and has parameters that are determined by a sponsor of the auction program. A sponsor of a program is generally an entity that wishes to provide some kind of incentive to participants in the program. For example, a car manufacturer can be a sponsor of an incentive program that provides incentive rewards to encourage participants to sell more cars. In this case, participants would comprise persons involved in selling cars. It should be noted that the invention is not limited to incentive programs in a sales environment. Other types of program environments include safety, quality, and various other types of programs. Such programs are within the scope of the invention, and the use of the term "incentive program" is meant to include these environments.

The parameters of an auction program in one embodiment of the invention include a program start date, a program end date, a program limit amount, a program bid increment, a restricted access flag, a restricted access time, a program ad link, and a program bank account number. The program start and end dates define the dates that the program is active. That is, the dates that participants can bid on items in the auctions. The program limit amount defines an upper bound on the value of auction items displayed to participants. This allows the sponsor to restrict view of items to those within the range of the rewards that are likely to be earned by the participants.

The restricted access flag determines whether or not access to the auction will be limited to certain hours of the day. If the flag is set, access will not be allowed during the time determined by the restricted access start and end times.

The auction program bid increment defines a minimum bid increment for items displayed to participants. The bid increment is the minimum amount over the current bid that must be submitted by a participant wishing to place a new bid on an item.

The program ad link defines a URL (Uniform Resource Locator) providing a link to a web page having advertisement or information content. For example, the web page may provide details on special deals available from the sponsor about which sales personnel can inform potential customers. In some embodiments, the ad link is created to the specifications of the client. The design, message, and use of this feature is determined among the client and the auction service provider.

The program bank account number is an identifier for an account that electronically stores reward media earned by a participant. Program participants are given a bank account number when they join a program in which reward media are electronically distributed. As reward media are earned or used, the bank account balance is adjusted to reflect the change. In some embodiments of the invention, the account number is collected as part of the registration information.

In some programs, paper certificates are used to represent reward media instead of electronic storage. In alternative embodiments of the invention, the participant enters the serial numbers of the certificates they are using when they bid.

Each sponsor's program has a program media associated with it. A program media comprises the reward units that are issued to participants upon meeting the program's requirements. One example of a reward media is AwardperQs® from Schoeneckers, Inc. A further example of a reward media is a frequent flyer mile. In addition, program media can have denominations. For example, the media may have denominations listed in different dollar amounts, with one denomination of the media being worth $25.00 while another is worth $0.10. Each auction program uses a particular program media and denomination, with some auction programs using the same media and/or denomination as others.

Figure 2:
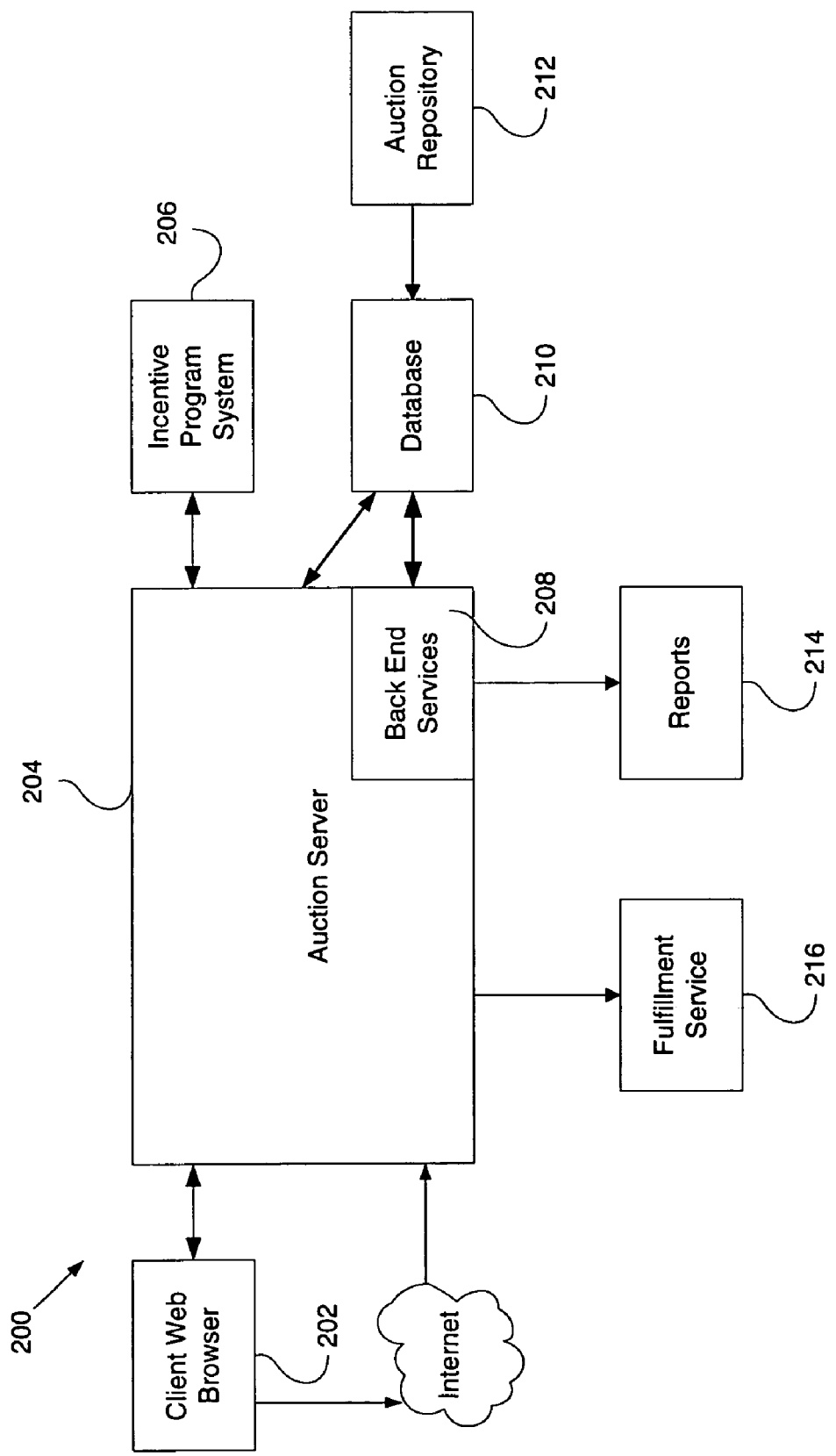
FIG. 2 is a diagram illustrating a system-level overview of an exemplary embodiment of the invention.

FIG. 2 illustrates the major software components of a system environment comprising various embodiments of the invention. Environment 200 includes a client web browser 202, an auction server 204, and an incentive program system 206.

Web browser 202 can be any of a number of web browser applications known in the art that run on computers such as the computer described above in reference to FIG. 1. Examples of such browsers include the Netscape Navigator browser from Netscape Communications Corporation and the Internet Explorer browser available from Microsoft Corporation. In some embodiments of the invention, the client web browser 202 must be at a particular version number or newer in order for the web pages generated by the system to be displayed properly.

Auction server 204 is a web server system that provides web pages to, and receives input from the client web browser 202. The auction server can run on a computer such as the computer described above in reference to FIG. 1. In one embodiment of the invention, referred to as the Q-bid system, the auction server maintains an auction database 210 of items available for bidding, along with start and end times of the auction. Auction server 204 implements the methods detailed in FIGS. 3 and 4, and provides web pages illustrated in FIGS. 5–12 to web browser applications 202.

Database 210 provides persistent data storage for data used by auction server 204. In one embodiment of the invention, the database system is an Oracle database system. However, the invention is not limited to any particular database system and in alternative embodiments of the invention the database system can be Informix, Sybase, Microsoft SQL Server, etc.

A number of processes support the operation of auction server 204. The processes can be implemented in any manner known in the art. In one embodiment of the invention, a start auction process, a close auction process, and an update auction process all operate as a component of auction server 204. The start auction process constantly monitors an auction table of database 210 and flags all auctions whose start date is greater than or equal to the current system date. The start auction process will also flag an auction as an 'Open' auction and 'Active' auctions. In one embodiment of the invention, the process comprises one or more stored procedures in database 210. In an alternative embodiment, the process is a Java servlet that invokes SQL commands to manipulate auction tables in database 210. The process can be scheduled to run periodically, and in one embodiment of the invention, the process runs at approximately two to three minute intervals. However, the invention is not limited to any particular interval time.

The close auction process monitors the auction table in database 210 and flags all auctions whose end date is greater than or equal to the current system date. These auctions are flagged as 'Closed'. Like the start auction process, the close auction process can be implemented in various ways known in the art, such as stored procedures in database 210, or as a Java servlet that invokes SQL commands. In one embodiment of the invention, the close auction process runs every two to three minutes, however the invention is not limited to any particular time interval. It should be noted that the close auction process only processes active auctions and skips suspended auctions.

The update auction process runs through an auction bid list maintained within database 210 and marks winners of auctions. The update process will also flag the winning bid entries in the auction list and mark auctions as 'Resolved' once the winners are known.

Auction server 204 includes back end services 208. In one embodiment of the invention, the back end services 208 perform various auction-related functions. These functions include participant profile maintenance, rules maintenance, auction and auction items maintenance, program code maintenance, media denomination maintenance, media type maintenance, product catalog maintenance, product category maintenance and viewing bids.

In one embodiment of the invention, the auction maintenance performed by back end services 208 includes functions such as entering new auctions, setting a start date and an end date, minimum bid information, etc. Another auction maintenance function of the component 208 is flagging auctions active or inactive. This flagging is typically only done in exceptional cases. An auction manager has the ability to temporarily shut down or suspend an auction. In one embodiment of the invention, back end services 208 also performs program code maintenance functions. These functions include the addition, deletion, viewing or maintenance of program codes, which can be made available to various customers. Database 210 includes a field that provides a means for an auction program to be set up with a restriction on participation during various hours of the day. If this flag is set then participants in the program can no longer take part in a bid during these restricted hours. The time will be read from the machine the participant logged into the site from. Database 210 also includes a field that stores a threshold value in dollars. Any auction item above this upper limit will not be displayed to program participants. This check can be performed for all of the various auction views.

Denomination maintenance functions are also performed by back end services 208. The functions include the addition of denominations valid for the various media types supported by the system. In one embodiment of the invention, the media types include incentive reward points, frequent user or frequent buyer points. In addition, the media types can include currency from foreign countries. In one embodiment of the invention, the denominations held in the table are for $0.10, $0.25, $1.00, $2.5 and $25 denominations. However, the invention is not limited to any particular denomination combination.

Product catalog maintenance functions, performed by back end services 208, include adding, deleting or maintaining data regarding products that can be placed on an auction. This module provides inventory maintenance functionality, and depending on auction strategies, the auction manager can place products on auction using this function.

Back end services 208 also performs product category maintenance functions in one embodiment of the invention. In this embodiment, there are seven categories, however the invention is not limited to any particular number of categories. The categories are:

Antiques and Collectibles
Fun and Games
Home
Sports Memorabilia
Personal Accessories
Travel
Miscellaneous Back end services 208 support a bid maintenance module in one embodiment of the invention. This module provides a mechanism for viewing auction data prior to the close date. In one embodiment of the invention, the resolution function of back end services 208 performs fund verification and winner notification. This function is performed for each auction after resolution of bids. In one embodiment of the invention, the winner notification process of component 208 sends out e-mails to all those participants who have been deemed winners. In addition, the system will prepare notification to participants that may have been high bidders, but could not be awarded the item as a result of insufficient funds being available.

Finally, back end services 208 generates reports 214 in one embodiment of the invention. Included in these reports is an Auction Resolution Report. When an auction closes, this report will include the auction number (id), item, quantity, type of auction, bids, bidder information (such as shipping details, program in which the recipient is a member) and value of bidder's points. This report is useful should manual resolution of the auction be required. In addition to the Auction Resolution Report, an activity report detailing how many hits to the site can be produced.

The format of the reporting can vary in different embodiments of the invention. For example, reports can display query results or they can be hard copy reports, with the ability of being able to print them on demand. An example of specific type of query is the bid history report, which lists the exact time a user submits a bid, the auction ID, the user name, and the quantity of the bid.

In one embodiment of the invention, auction repository 212 supports the back end services functions detailed above. In this embodiment, the auction repository 212 provides persistent storage for intermediate data. The intermediate data comprises auctions that are to be merged into the data that currently exists in database 210. Database vendors typically provide a mechanism for importing data in various formats, this import mechanism can be used to merge the data from auction repository 212 into database 210. In one embodiment of the invention, the auction repository 212 is an Access database. However, the invention is not limited to such databases. For example, in an alternative embodiment of the invention, the auction repository 212 comprises an Excel spreadsheet containing auction data. In a further alternative embodiment, the auction repository 212 comprises a file, such as a comma separated value (CSV) file. In a still further embodiment, the repository can be an Oracle database.

Incentive reward system 206 is a system that implements the rules of an incentive reward system, and that also tracks the number of reward points awarded to a participant. In one embodiment of the invention, the incentive reward system is the AwardperQs reward system available from Schoeneckers, Inc. The auction server 204 communicates with incentive program system 206 at predetermined times to determine if the successful bidder has enough points to acquire an item available on the auction site.

Fulfillment service 216 provides auction fulfillment services for the system. In one embodiment of the invention, data files are communicated to the fulfillment service, detailing the items that need to be provided to the winning bidders, and the shipping details. The data files can be provided in a required format to enable backend systems to complete accounting, shipping and delivery options. In an alternative embodiment of the invention, the fulfillment process will be built for manual methods.

An example of the operation of the system described above will now be provided. In the example below, a program sponsor, also referred to as a client, elects to allow their program participants access to the auction server. A Letter of Agreement is generated by the auction service provider. The form is signed by the client and returned to auction provider. The auction program is then set up in the database 210 of auction server 204.

The appropriate program code, based on the reward media used in the sponsor's program, can be given to an account manager for distribution to the program participants. Program codes can be created for each client program. In an alternative embodiment, each program has a separate pass code.

Once a program participant has received a Program Code, they can enter the auction and interact with auction server 204 via client web browser 202. In one embodiment, upon entering the web site provided by auction server 204, the participant is given three choices. If they are a first time user, they click on the "first time user" button. If they are already registered, they enter their user name established when they previously registered using their Program Code. As a third option, the user can receive a temporary password if the original password has been forgotten.

In one embodiment of the invention, when a participant selects the register button, they are taken to the registration page. They are required to provide their name, address, telephone number, user name, password, and e-mail address in order to continue. In an alternative embodiment of the invention, participants can use the postal system to send and receive mail regarding their participation in the auction site. The alternative embodiment provides for registration and participation by those who have access to a web browser, but do not have an e-mail address. In yet another alternative embodiment (not shown), participants can send and receive communications through a web page.

From the registration page (or the front page if already registered) the participant proceeds to the auction server web page. The auction server web page is where all the items for bid are listed along with the time remaining in the auctions, the current high bid, quantity, and the type of auction. In one embodiment of the invention, the participant can click on a link naming the item being auctioned to go to a bid screen for the item. In an alternative embodiment of the invention, there is a button next to each item listed that allows the user to "go to" the item being auctioned.

At the item bid screen, descriptive information about the item as well as an image of the item is displayed. This is where a bid can be placed. The type of auction, starting bid, bid increment and current bid are displayed. An empty box is provided for the user to place their bid. An empty box for the participant's certificate number(s) is also provided, if the user is a participant in a certificate-based program. Once the bid certificate information is completed, the bidder clicks the "submit my bid" button.

Some embodiments of the invention provide an item bid history tab. This feature gives the user information on the history of the other bidders' activities. The information in this tab includes the other bidders' user names, desired quantity of each bid, and the bid amount of each bid. The menu ranks the bid amounts according to the current high bidder and descending bids within the auction.

When a bid is submitted, the next screen the participant sees is the confirmation screen. The amount of the bid, the account/certificate numbers and mailing address are displayed. Instructions can be given to the bidder to make any necessary corrections at this point. Text is also included about the binding nature of the bid. In one embodiment of the invention, when the user is satisfied with the information they are providing, they have two options —1) "submit my bid" or 2) "cancel". After one of these buttons is selected, a message confirming the bid has been received is displayed. Bids on other items can be placed at this time. In one embodiment of the invention, the user can change or delete a bid after it is submitted to the auction server. After the system confirms the user's bid, all bids are biding to the user.

If the participant has placed a winning bid they are notified by e-mail. Before the e-mail can be sent, the participant's earnings balance must be verified to ensure they have enough earnings to cover their bid. In an alternative embodiment of the invention, the auction engine will be connected to the provider's database or incentive program system 206 so that confirmation of balances can occur automatically.

Bid amounts are displayed and received based on media types used by the participant. The media type describes the reward media used to purchase auction items. In one embodiment of the invention, there are five standard media types are available—(1) AwardperQs Certificates, (2) AwardperQs Gold, (3) Mileage Money (4) AwardbanQ, and (5) Awardcard. Others can be created as needed for different values.

One aspect provided by the various embodiments of the invention is the ability to accommodate users in various programs who may have different values of AwardperQs, or other types of reward media. All users in participating programs can bid against each other on the same pool of merchandise; regardless of the value of their reward media. Each participant will see on the various screens ("auction server", "place a bid" and "winning bid"), item and bid values appropriate to their program. The auction server 204 uses the methods described below to automatically adjust the input and output values in a manner appropriate to the program.

For example, assume that five participants A–E are viewing an item, and that the starting bid on the item is set in the auction database at $25. Further assume that each participant is in a distinct program, and that each program has a different denomination value, where A's denomination value is 25, B's 2.5, C's is 1, D's is 0.25, and E's is 0.10. In this example, Participant A's screen shows the starting bid as 1, participant B's screen shows 10, C shows 25, D shows 100, and E shows 250. In this example, the values are not dollars, but AwardperQs or some other form of points, credits or reward media. However, as noted above, the invention is not limited to reward media and in alternative embodiments of the invention, the values displayed and maintained by the system are values in the currency for a particular country for a program participant.

Next, assume that participant A, raises the bid to 2 (in their reward media and denomination). The current high bid displayed to the other participant's changes as appropriate for their program, as illustrated in Table 1 below.

TABLE 1

|  | A | B | C | D | E |
|---|---|---|---|---|---|
| Original value | 1 | 10 | 25 | 100 | 250 |
| New current bid | 2 | 20 | 50 | 200 | 500 |

The bid increment is dynamic depending on the value of the user's reward media. To continue with the example above, the bid increments would be as follows:

A=1
B=10
C=25
D=100
E=250

The winning bid screen is also dynamic, showing the winning bid value according to the user's reward media. For example, assume participant D raises the bid by two increments, i.e. by 200 in D's reward media and denomination. Participant D above wins the auction at 400. Other visitors to the winning bid screen would see:

A=4
B=40
c=100

D=400

E=1,000

The auction server 204 does all the calculations on a real-time basis so that all users see current and appropriate numbers at all times.

The official rules page will include information on the auction rules, privacy, eligibility, bidding, payment, sales taxes, shipping, returns, reserved rights, trademark information, system integrity, warranty information (including the fact that no warranty exists), limitations on liability, indemnity, general compliance with laws, no agency, notices, arbitration, governance, etc.

The winning bids page will display the item name, when the auction ended, user name, the amount of the winning bid and the items won. In addition, a history page of winning bids can be maintained for a predetermined amount of time. The invention is not limited to any particular time period, and it can be one week, one month, one year, or other suitable time period.

There are various types of auctions with their own set of rules. The auction server 204 can use more than one auction type depending on the number of items available. When there is only one of a particular item, a straightforward English auction can take place. If there are multiple quantities of an item, a Dutch auction, or a variation known as the Yankee auction, can be used. The type of auction is displayed on the "auction details" screen and the rules for the various types of auctions can be found on the "official rules" screen. In an alternative embodiment of the invention, there is a link from the type of auction on the "auction details" screen to the appropriate definition on the "official rules" screen.

An alternative embodiment of the invention provides for the inclusion of a reserve price in every auction. The reserve price is a secret price that is not known by any of the users on the auction site. The predetermined reserve price must be obtained before the close of the auction to have any successful bidders. If the auction closes and the no bidder satisfies or bid beyond the reserve price, the auction closes with no winners. Any bidding beyond the reserve price is handled according to the same rules as an auction without a reserve price.

At the conclusion of an auction, the auction server 204 automatically produces a file of all bidders and their information. This information can include user name, address, phone, e-mail, item bid, type of auction, minimum bid, amount bid, account/certificate number(s) and shipping address (if different from registration address).

On a regular basis the orders are processed and shipped to the winners. In one embodiment of the invention, the processing is automated between the auction engine and an order management system. However, winning bid fulfillment can also be a manual process.

A further aspect of the system is that the auction server can cause messages to be displayed to the user when the user logs into the auction system. These messages can include messages specific to a particular program the user is participating in, or the messages can be of a general advertising nature. For example, if a user is a participant in a program that provides reward points for each sale of a computer system, the message can be directed to special pricing programs available from the sponsor that the user can provide to their customers in order to generate more sales for the sponsor, and therefore, more reward points for the user.

Methods of an Exemplary Embodiment of the Invention

Figure 4:
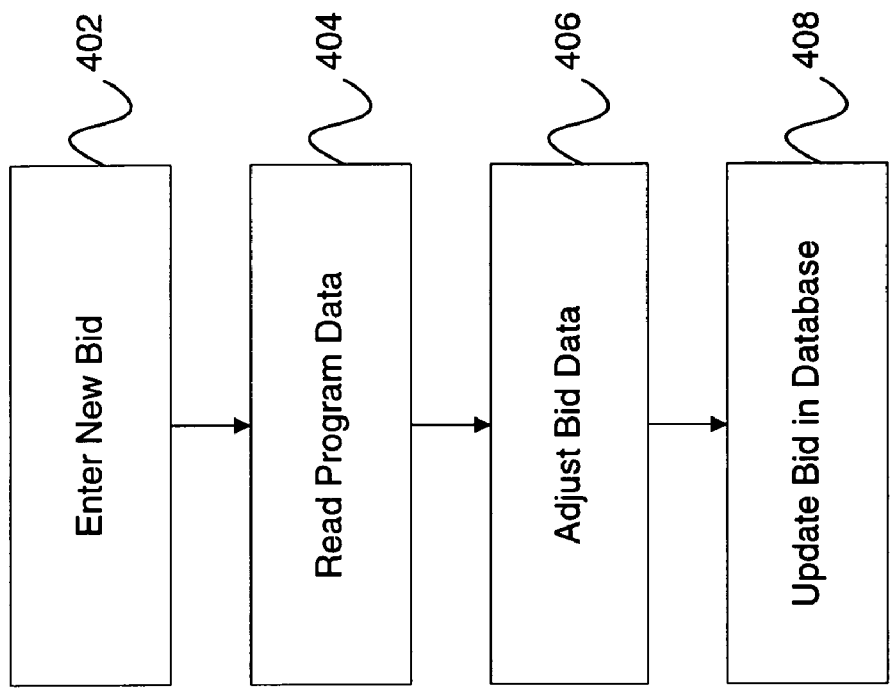
FIG. 4 is a flowchart of a method performed by a computer according to an exemplary embodiment of the invention.

In the previous section, a system level overview of the operation of an exemplary embodiment of the invention was described. In this section, the particular methods of the invention performed by an operating environment executing an exemplary embodiment are described by reference to a series of flowcharts shown in FIGS. 3–4. The methods to be performed by the operating environment constitute computer programs made up of computer-executable instructions. Describing the methods by reference to a flowchart enables one skilled in the art to develop such programs including such instructions to carry out the methods on suitable computers (the processor of the computer executing the instructions from computer-readable media). The methods illustrated in FIGS. 3–4 are inclusive of the acts required to be taken by an operating environment executing an exemplary embodiment of the invention.

Figure 3:
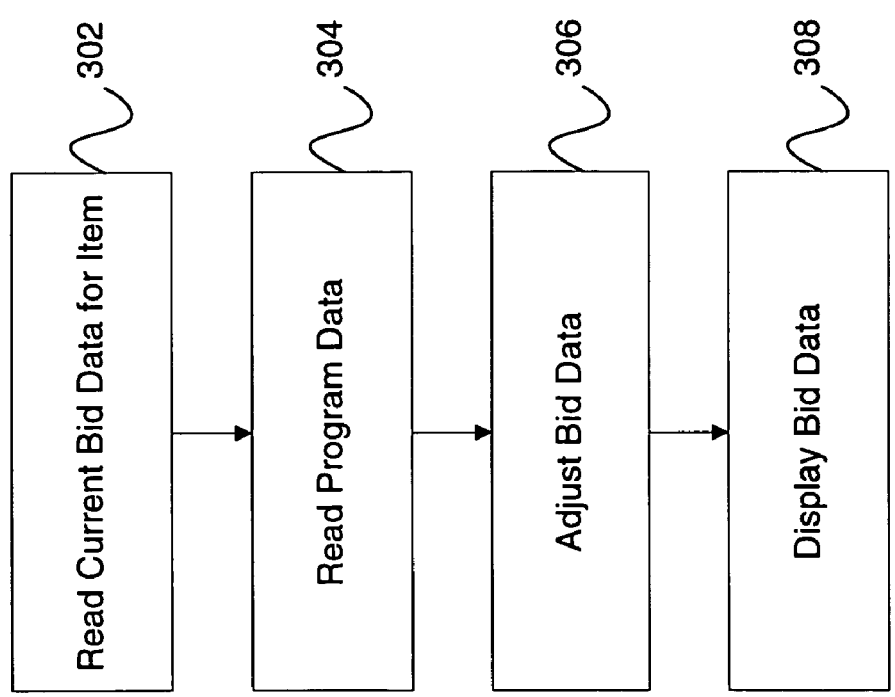
FIG. 3 is a flowchart of a method performed by a computer according to an exemplary embodiment of the invention.

In FIG. 3, a method for displaying bid data is shown. The method begins when an application, such as client web browser 202 requests an auction web page from a program executing the method, such as auction server 204. Auction server 204 reads the current bid data for an item (block 302). The bid data can consist of the current high bid, the bid increment, the reserve amount, and the bid history. The invention is not limited to any particular combination of bid data.

The auction server 204 also identifies which program that a participant requesting the data is participating in. The program then determines the bid media for the program (block 304). The bid media is a pricing system associated to the type of program being offered. In one embodiment of the invention, the bid media is an incentive reward media, such as points in an incentive award system, a frequent flyer mile, or a frequent buyer award. In an alternative embodiment of the invention, the bid media is a currency for a country.

It should be noted that the tasks performed at block 302 and block 304 need not be performed in the order described, and block 304 could be performed before block 302.

Next, at block 306, the program converts the bid data retrieved at block 302 into the bid media determined by block 304. This conversion typically involves multiplying the bid data by a scaling factor determined by a denomination value for the media. Examples of such conversions can include converting a dollar amount to a reward point amount, converting a reward point amount in one program to a reward point amount in another program, or converting between denominational amounts within the same program. Finally, each of the bid data amounts converted is displayed to the participant (block 308).

A method of updating a bid amount is illustrated in FIG. 4. The method begins when a program executing the method, such as auction server 204 receives a new bid from a participant (block 402).

The server then determines which incentive program the participant submitting the bid belongs to and reads program data for the program (block 404).

This program data includes the media type and denomination for the program. The server then adjusts the bid data by converting the bid received at block 402 to the unit maintained for the item in the auction bid data (block 406). The converted amount is used to update the auction database (block 408).

It should be noted that the program data and the bid amounts used in the methods illustrated in FIGS. 3 and 4 have been described in terms of incentive reward amounts.

In an alternative embodiment of the invention, the program data can be substituted with a local currency amount, that is, the currency that is used in the participant's home country. Likewise, the bid data in the bid database can be stored as an amount in a currency for a different country. In this case, the conversion performed is that of a currency conversion to and from the local currency and the database currency.

An Exemplary Embodiment of the Invention

FIGS. 5–13 illustrate inventive aspects of one embodiment of a computerized incentive reward system 200, having an auction component. FIGS. 5–13 illustrate various screen displays as a participant navigates through various components of the system. As will be appreciated by those of skill in the art, the invention is not limited to any particular order of navigation, and variations from the order presented in detail below are within the scope of the invention.

Figure 5A:
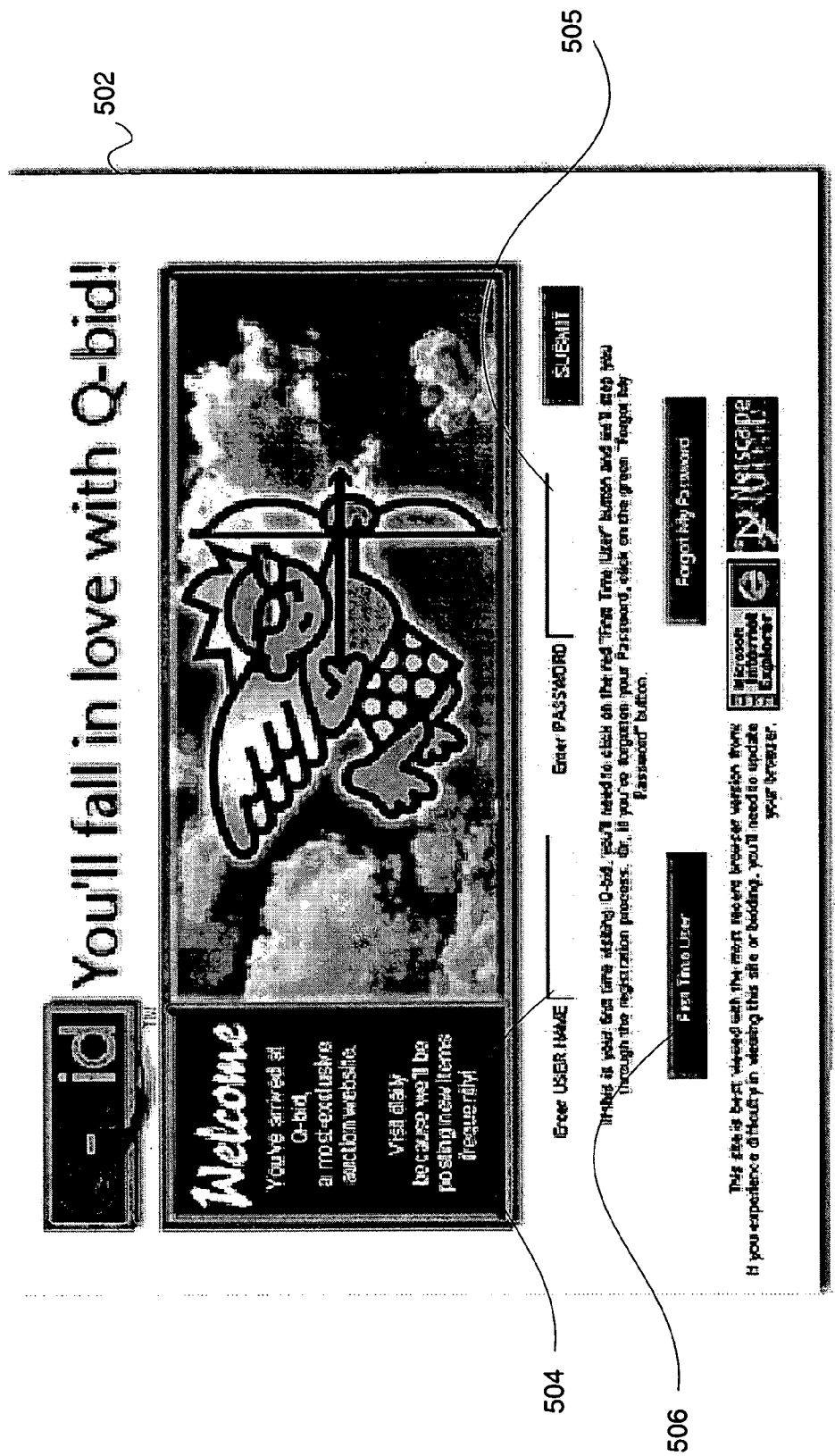
FIGS. 5A and 5B illustrate login screens according to an embodiment of the invention.

FIG. 5A illustrates a login screen 502 according to an embodiment of the invention. In one embodiment of the invention, login screen 502 includes a user name field 504 and password field 505. A participant selects a user name and password when they register with the system. In addition, login screen 502 includes a first time user button 506.

Figure 5B:
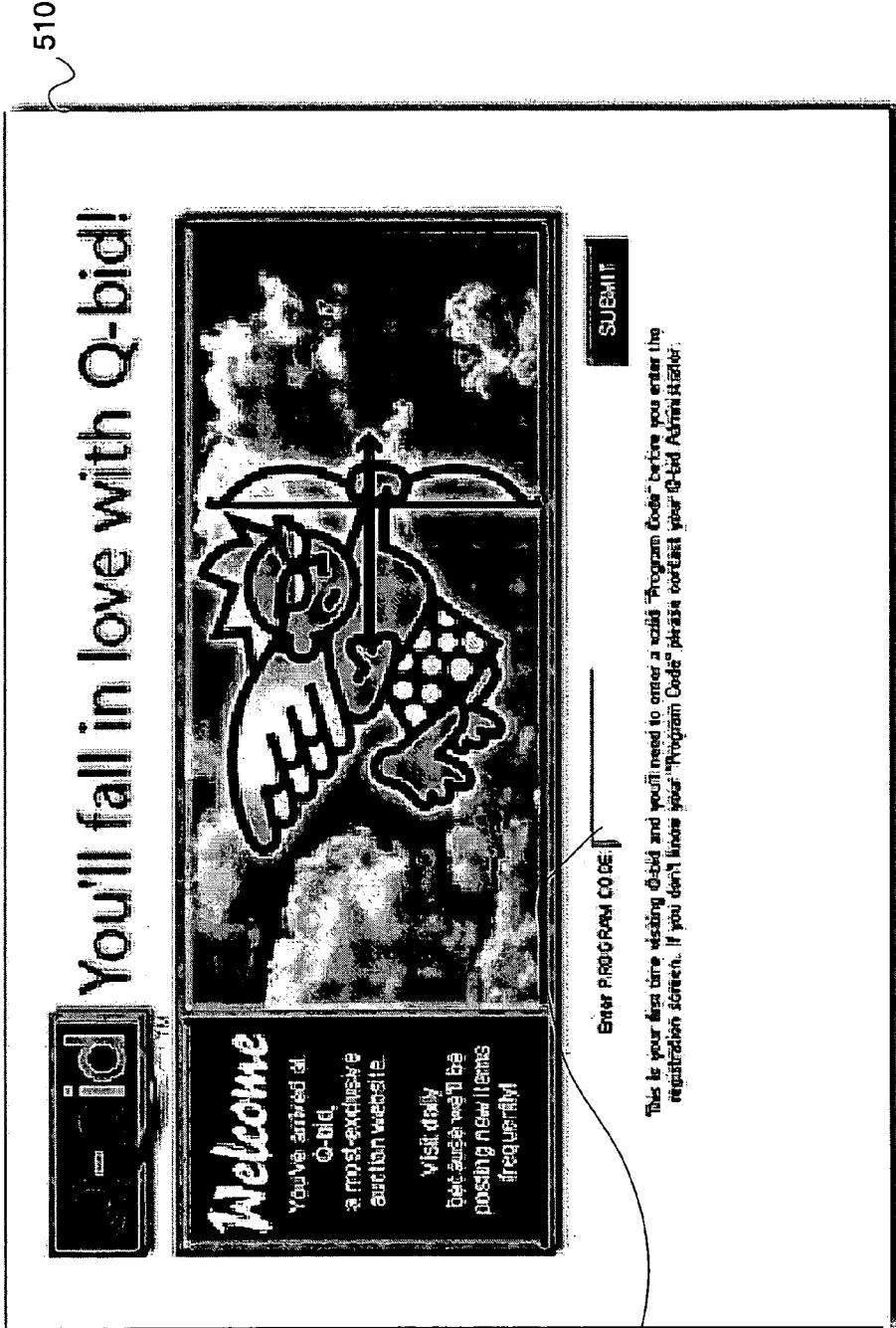

FIG. 5B illustrates a Program Code screen 510 according to an embodiment of the invention. Screen 510 is displayed in response to pressing first time user button 506. In this embodiment, a valid Program Code must be entered in Program Code field 512 in order to register with the system. The system validates the Program Code by checking to make sure the code represents a program that is currently in operation, that is, the current date is between the start and end dates for the program.

Figure 6:
FIG. 6 illustrates an exemplary registration screen according to an embodiment of the invention.

An exemplary registration screen 602 is shown in FIG. 6. Exemplary screen 602 includes a number of fields 604 used to identify the participant, including the participant's name, address, telephone number, e-mail address, and desired user name and password. As those of skill in the art will appreciate, other information about a participant can be requested, the invention is not limited to any particular combination of participant details. In one embodiment of the invention, the system validates the participant's address, and will not allow P.O. boxes to be specified as an address. In some embodiments of the invention, incentive programs that provide for the electronic storage of reward media are represented by program code 512. In this case, account number field 606 is presented on screen 602 to allow the user to enter the account number identifier. If the program represented by program code 512 does not provide for the electronic storage of reward media, some embodiments of the invention do not display field 606.

Returning to FIG. 5, after obtaining a user name and password, the participant must enter these items in field 504, whenever the participant wishes to access the system. In one embodiment of the invention, the user name and password are valid only for a particular program, and the participant must obtain a new user name and password for each program the participant wishes to participate in. In addition, in some embodiments the participant must obtain a temporary password if the participant forgets the password. Upon entry of a valid user name and password, the system checks the date that the participant last logged in to the system. If the rules for the program have changed, a window (not shown) is displayed showing the new rules. The participant must then accept the new rules or decline participation in the program.

The system also monitors the entry of invalid passwords. In one embodiment of the invention, if a participant enters an invalid password three times in a row, the system will not allow the participant to enter the user name to login for a period of fifteen minutes. As those of skill in the art will appreciate, other time periods could be substituted.

Figure 7:
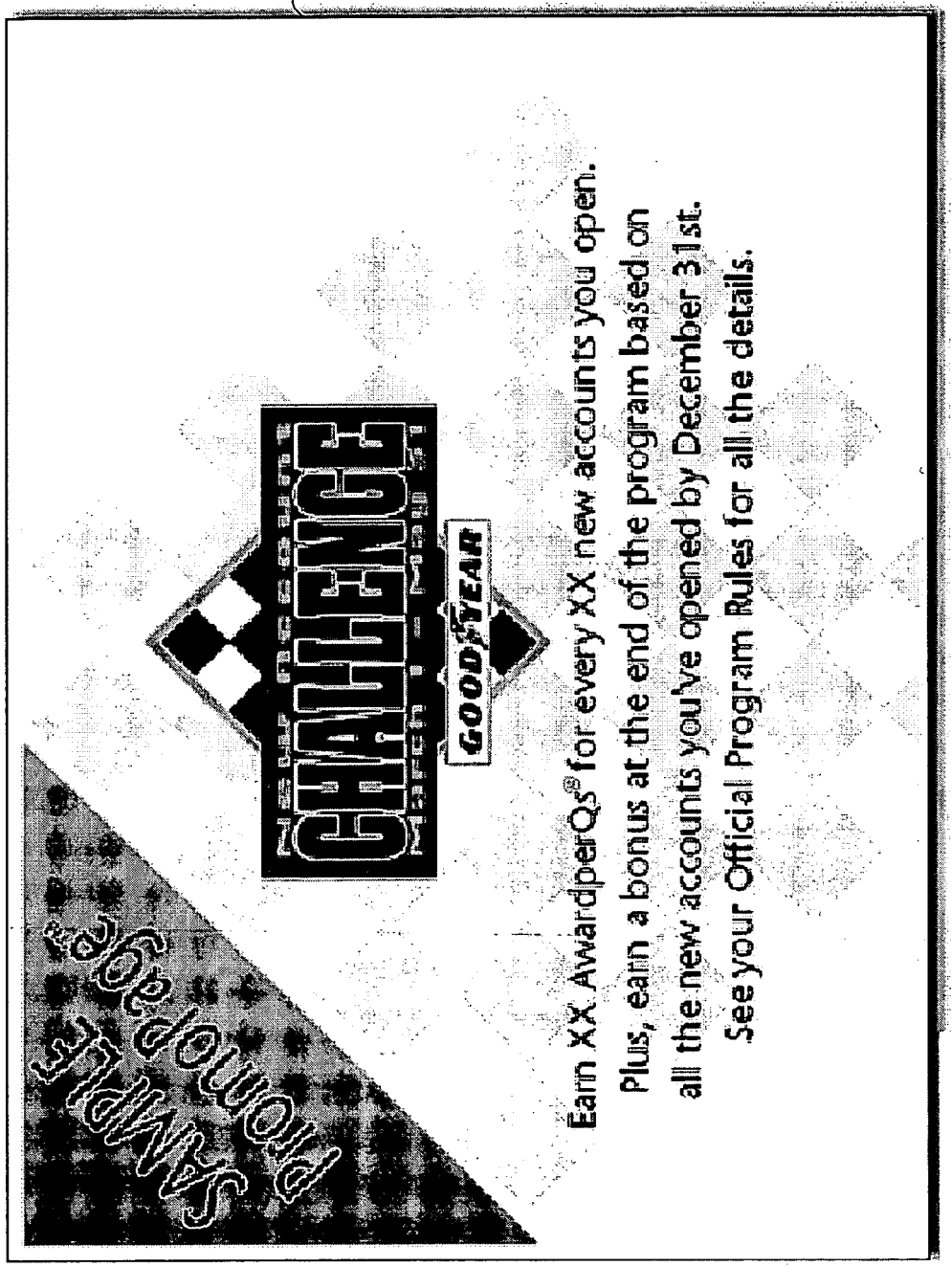
FIG. 7 illustrates an exemplary linked advertising screen according to an embodiment of the invention.

Upon entry of a valid user name and password, in one embodiment of the invention the system checks to see if the auction program has an "adlink" field populated, a new browser window is opened and a linked advertising window is displayed. FIG. 7 illustrates an exemplary advertising window 702. In the exemplary window, information about the program can be displayed to the participant. For example, assume the incentive program is meant to provide incentive to sell computer systems. The advertising window 702 can display information about reduced prices on particular computer systems that the participant can pass on to their customers in order to increase sales, and thereby accumulate incentive reward points that can be used in the auction.

Figure 8A:
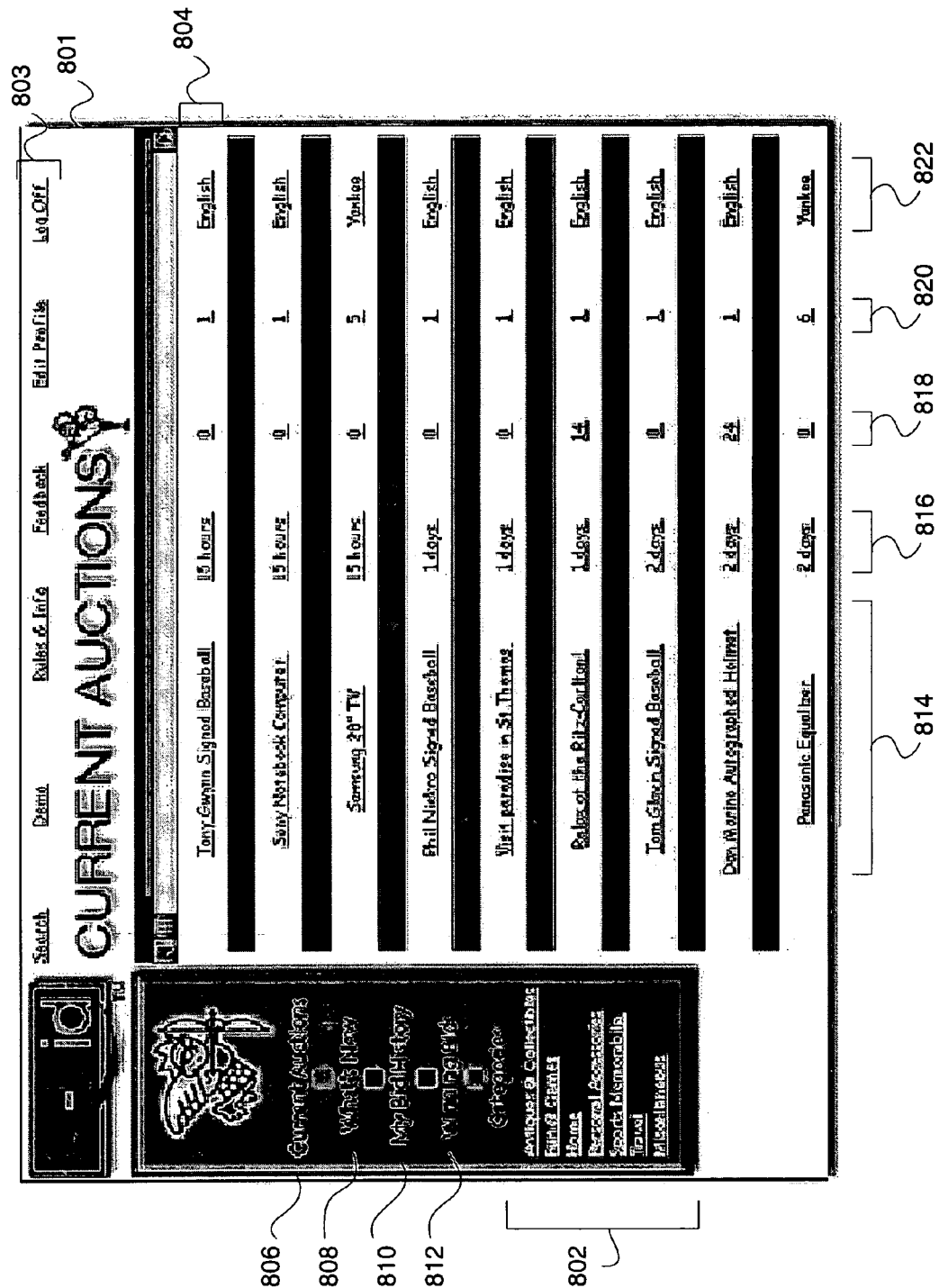
FIGS. 8A and 8B illustrate exemplary auction server pages according to an embodiment of the invention.

Upon entry of a valid user name and password, and display of a linked advertising window, if any, the auction server main page is displayed. FIG. 8A illustrates an exemplary auction server main page 801 according to an embodiment of the invention. As shown, auctionator main page 802 includes a navigation menu 803, a current auctions link 806, a what's new link 808, a bid history link 810, a winning bids link 812, and category selection links 802. In one embodiment of the invention, navigation menu 804 includes the following menu entries:

| | |
|---|---|
| Search | Search the auction web site for auctions that match input parameters supplied by the participant. |
| Demo | Display a demonstration of the auction program's web site. |
| Rules | Display the rules associated with the auction program the participant is currently logged into. |
| Feedback | Provide feedback and commentary to the operators of the auction system. |
| Edit Profile | Edit registration details to provide updated address, telephone, e-mail address, or other profile information, with the exception of the user name, which once established, can not be changed. |
| Logoff | Flush details about the program the participant was logged into to prevent other users from accessing the information. Display linked advertising window if "adlink" field of auction program data structure is populated. |

The links on auction server page 801 operate as follows. The current auctions link 806 causes the system to display a running list of open auction items 804 in chronological order based on the bid-closing times of the items. Each auction item 804 in the list includes the auction name 814, time remaining 816, current high bid 818, quantity available 820, and auction type 822.

The auction name 814 identifies an item being auctioned, and is a text description of an item up for bidding. The description will typically give the name of the item, perhaps accompanied by a stock number.

The time remaining 816 indicates time that the auction will close. This is the point in time when no more bids will be accepted. At this point, the highest bidder, or bidders in the case of multiple available items, is determined and the item is "sold".

Current bid 818 is the current top bid for the item. The current bid 818 is expressed in the media type and denomination for the program that the participant is currently participating in, as determined from the user name and password the participant used during the login process. Participants of other programs may also be viewing the auction items displayed on auction page 801. The server will display current bid amounts in the denomination and units appropriate to their programs. Thus, a participant of one incentive program may see a different current bid amount than a participant in another program. However, the bid amounts displayed represent the same base amount for the item stored in the auction database. In an alternative embodiment of the invention, the media type and denomination are expressed in terms of a local currency for the participant.

Quantity 820 represents the quantity of the item that is available for auction. If a quantity equal to one is displayed, the participant submitting the highest bid at the time the auction closes will be able to purchase the item. If the quantity is greater than one, the item will be "sold" to the highest bidders until all items have been sold.

Auction type 822 indicates the type of auction and the rules that will be applied to the auction. Examples include English, Yankee, Dutch etc. Such auction types are well known in the art.

Auction page 801 also includes means to navigate through multiple pages when there are more items than will fit on one page. Those of skill in the art will appreciate that there are multiple mechanisms available to provide for such navigation, including "forward" and "back" buttons, scroll bars, and the like.

It will be appreciated by those of skill in the art that other means besides a table of items 804 could be chosen to present the information described, and that such means are within the scope of the invention.

Figure 8B:
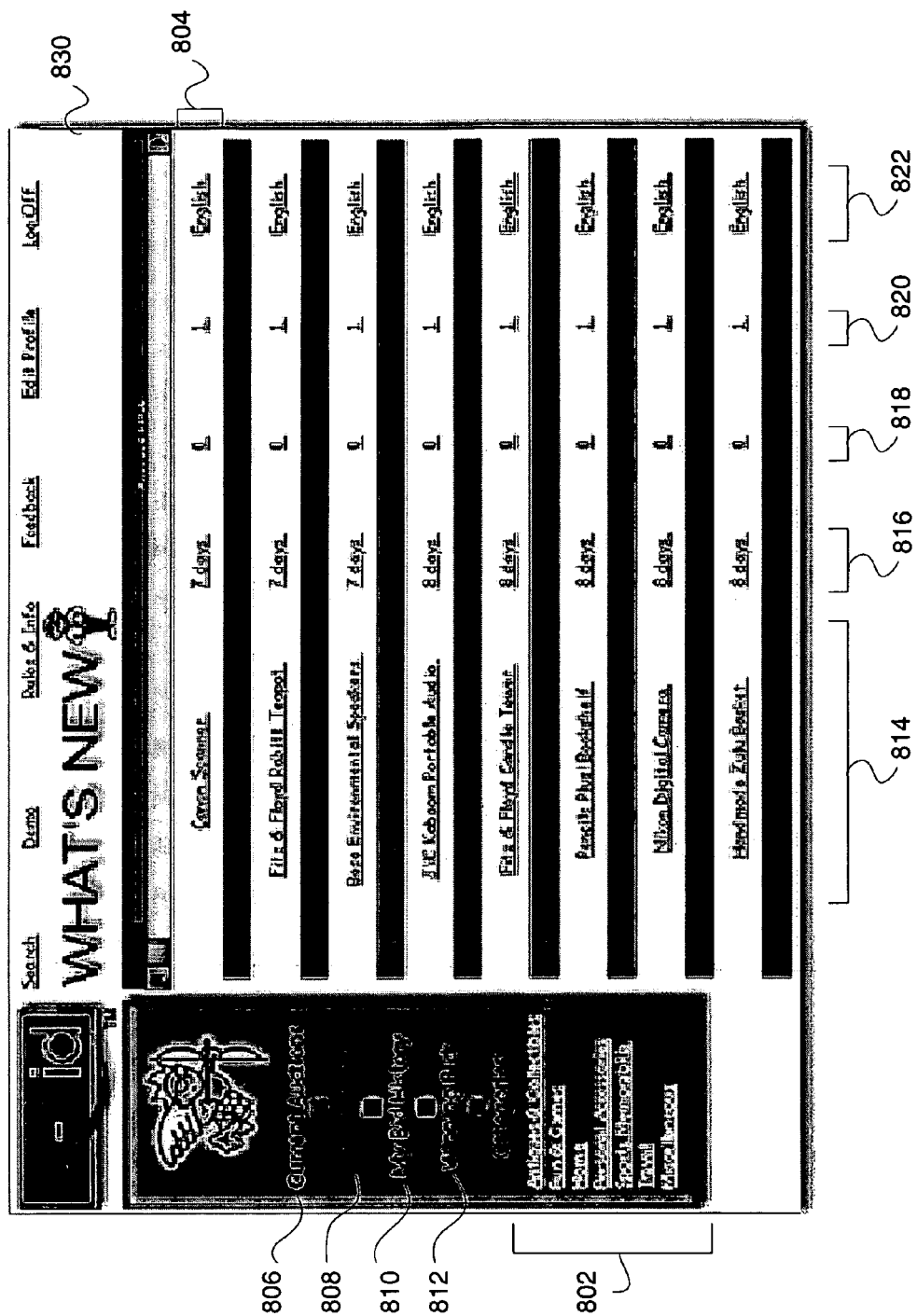

Invoking the what's new link 808 causes the system to display a running list of open auction items in chronological order based on most-recently added items. An exemplary new item screen 830 is illustrated in FIG. 8B.

Figure 9:
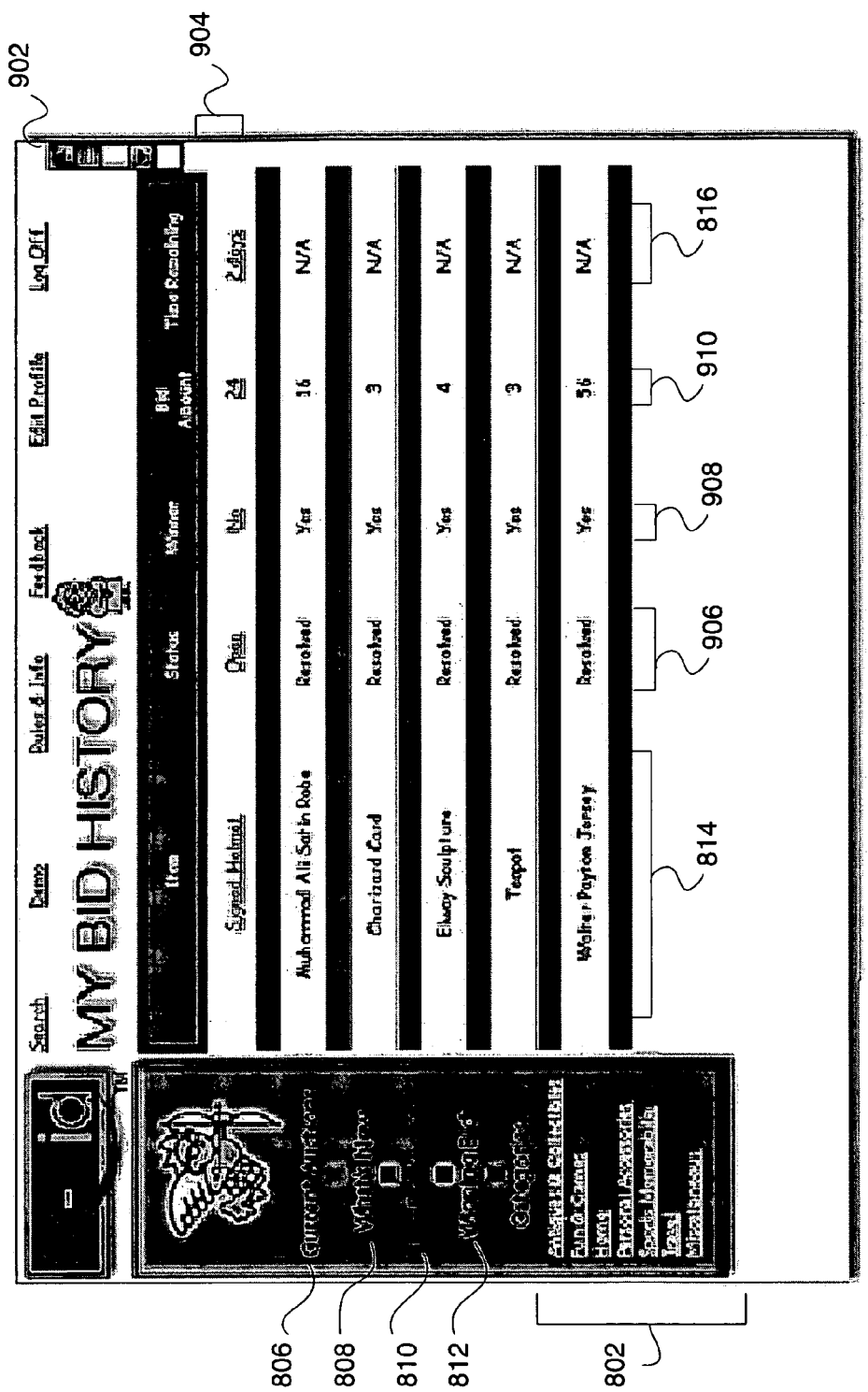
FIG. 9 illustrates an exemplary bid history page according to an embodiment of the invention.

Invoking the bid history link 810 causes the system to display a list of all of the auction items that a participant has bid on since the participant registered with the system. An exemplary bid history screen 902 is illustrated in FIG. 9. The list includes both those items where the participant submitted the winning bid, and those where the participant did not submit the winning bid. In one embodiment of the invention, each bid item 904 in the list includes the auction item 814, auction status 906, winner indication 908, bid amount 910, and time remaining 816. The auction status 906 indicates the current status of the auction, i.e. whether the auction is open and accepting bids, whether the auction is closed and no longer accepting bids, and whether the auction is resolved and the winning bidders have been finally determined. Winner indication 908 indicates whether or not the participant is the winner of the auction, bid amount 910 indicates the current bid by the participant.

Figure 10:
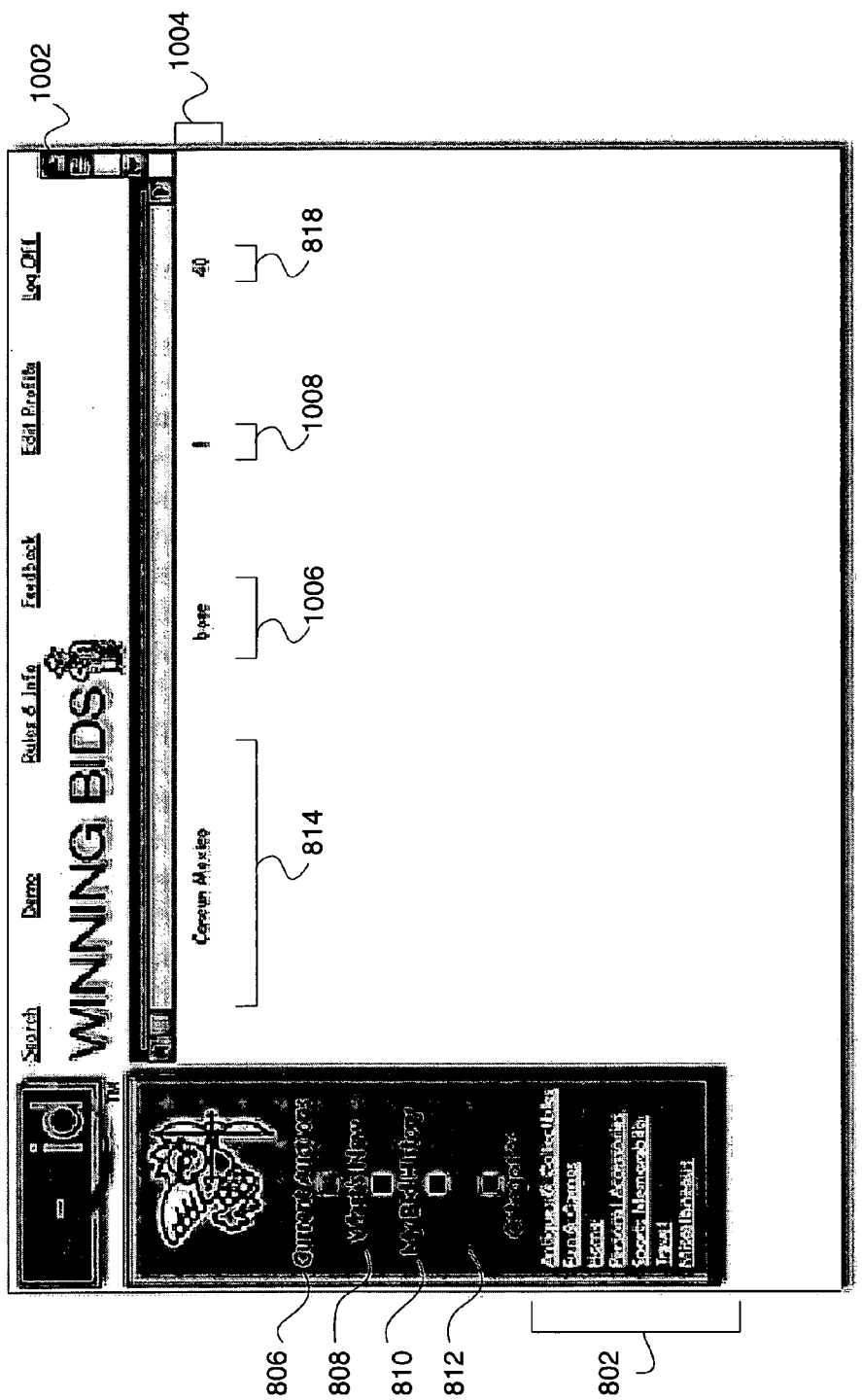
FIG. 10 illustrates an exemplary winning bid page according to an embodiment of the invention.

Invoking the winning bids link 812 causes the system to display the winning bids for items having a "resolved" status within the last thirty days. An exemplary winning bids screen 1002 according to an embodiment of the invention is shown in FIG. 10. The screen includes a list of winning bid items 1004. In one embodiment of the invention, the table displayed contains a row for each item that was closed within a predetermined period of time, which in one embodiment is thirty days. However, the invention is not limited to any particular number of days. In one embodiment of the invention, each winning bid item 1004 includes the auction name 814, a winning user name 1006, a winning bid quantity 1008, and a winning bid amount 818. The winning user name 1006 is the user name of the participant submitting the winning bid. The winning bid quantity 1008 indicates the quantity of the item bid on by the winning bidder. The winning bid amount 818 is displayed in terms of the media and denomination of the program that the participant that requested the page is currently participating in. Note that this program can be different from the program of the participant that submitted the winning bid. The winning bid amount is read from the database and converted per the method described in the previous section.

Figure 11A:
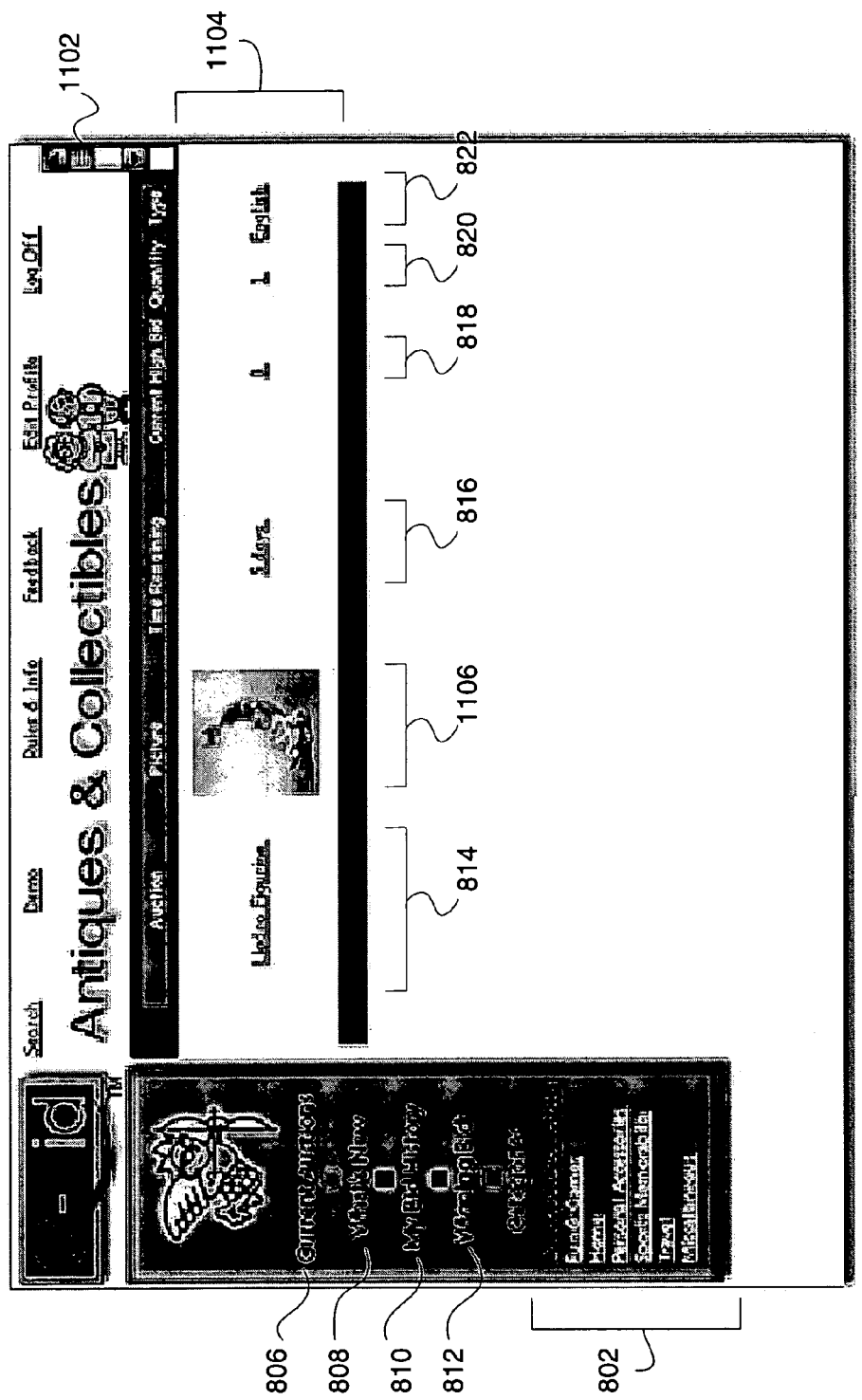
FIGS. 11A–11E illustrate exemplary auction category pages according to an embodiment of the invention.
Figure 11B:
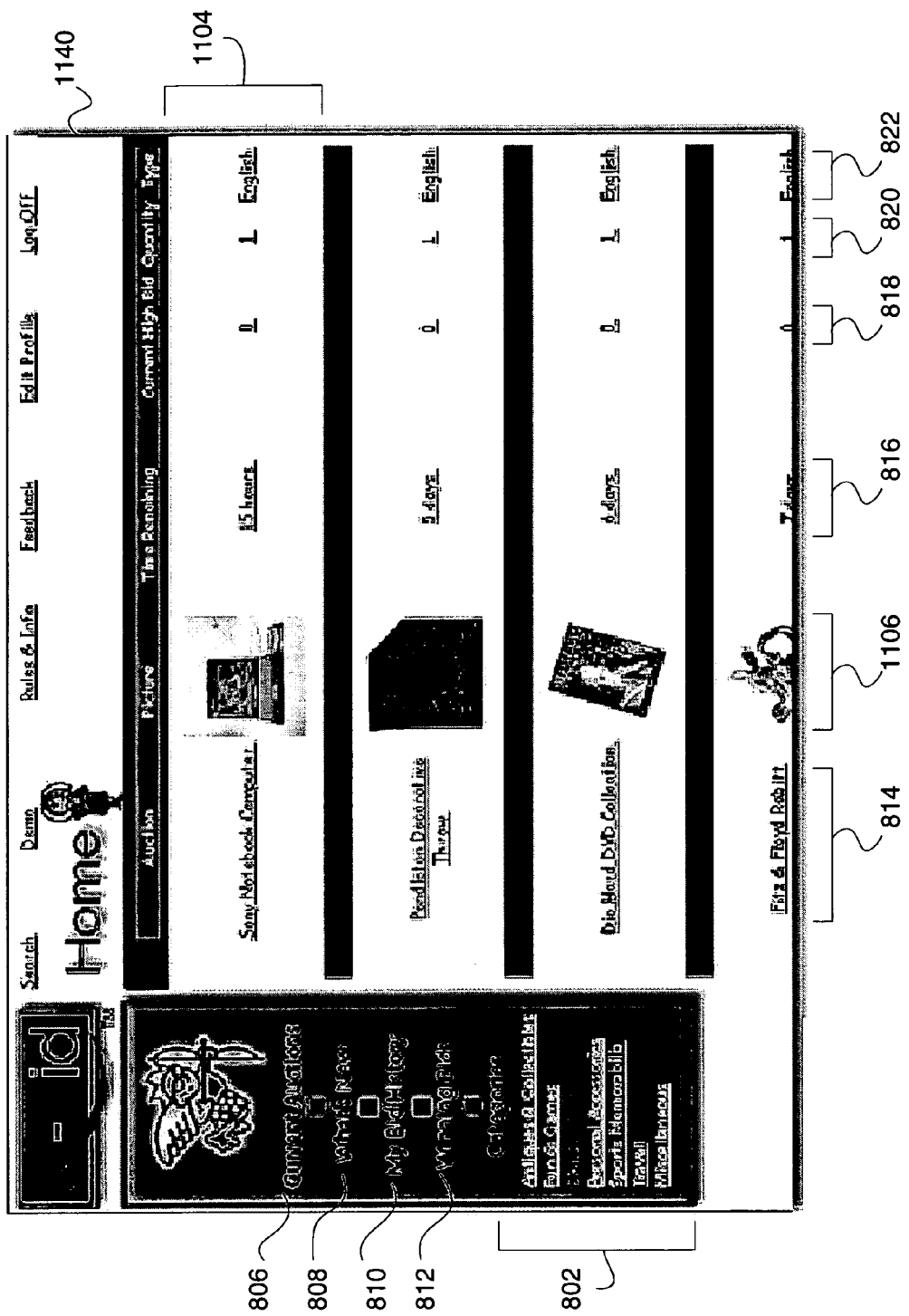
Figure 11C:
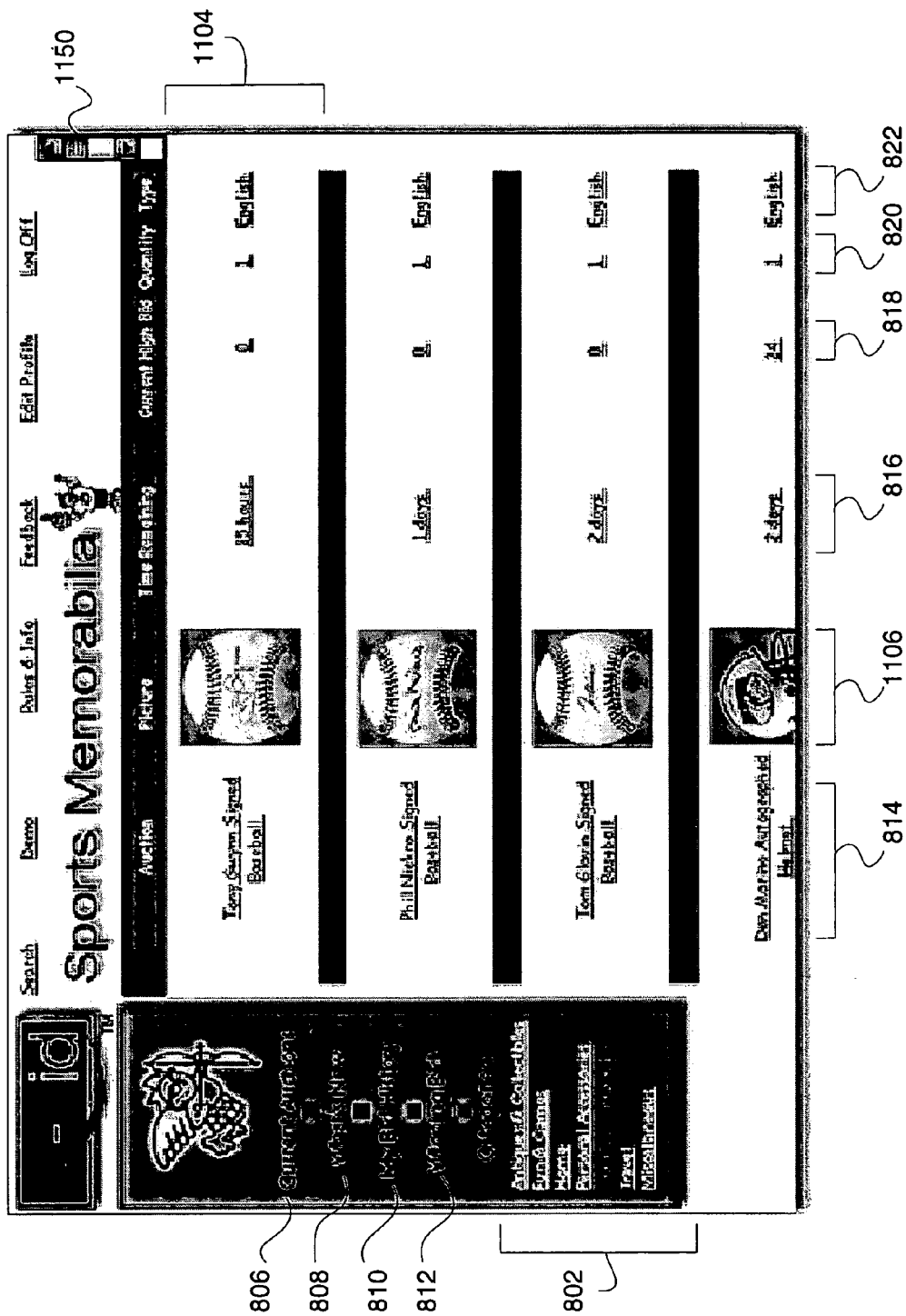
Figure 11D:
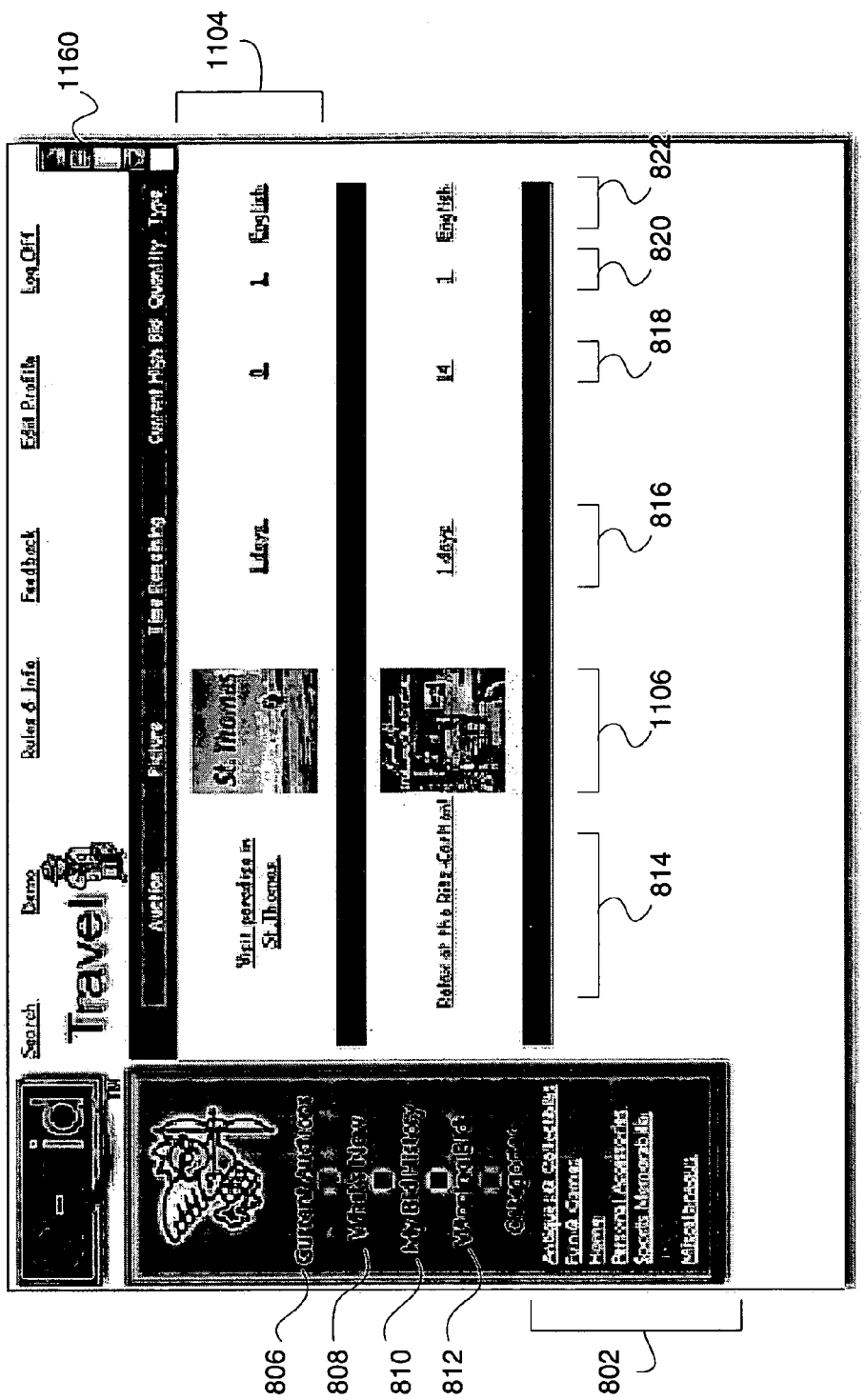
Figure 11E:
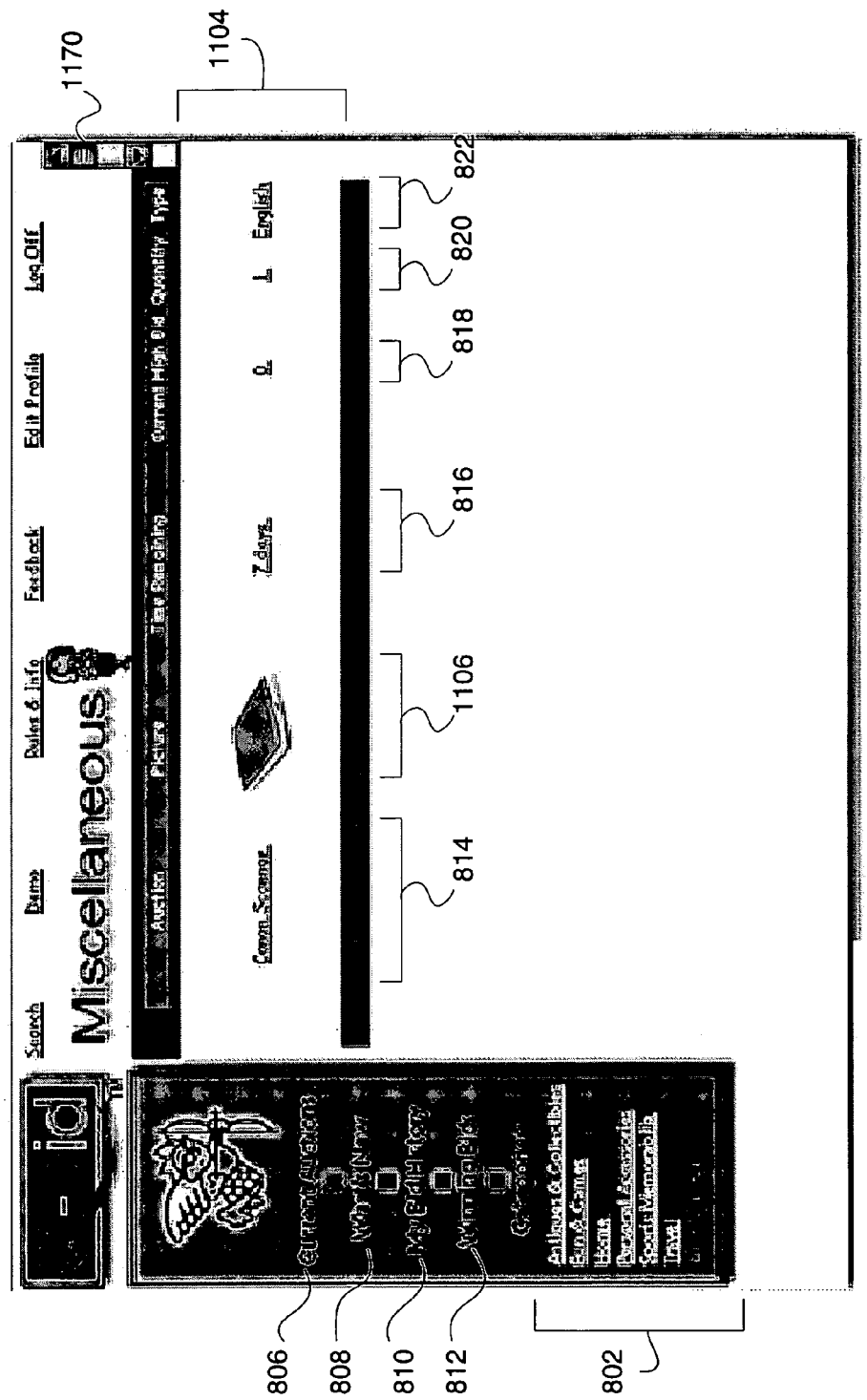

Invoking the select category link causes the system to sort auction items by category. In one embodiment of the invention, the categories are:
Antiques and Collectibles
Fun and Games
Home
Sports Memorabilia
Personal Accessories
Travel
Miscellaneous FIGS. 11A–11E provide details of exemplary screens that are presented upon selection of a category link 802. FIG. 11A provides an exemplary antiques and collectibles screen 1102 according to an embodiment of the invention. The screen includes a list of auction items 1104. For each item 1104, the auction name 814, item picture 1106, time remaining 816, current high bid 818, bid quantity 820 and auction type 822 are displayed. The auction picture 1106 represents a graphical view of the auction item. FIG. 11B illustrates an exemplary home auction items screen 1140, FIG. 11C illustrates an exemplary sports memorabilia screen 1150, FIG. 11D illustrates an exemplary travel screen 1160, and FIG. 11E illustrates an exemplary miscellaneous screen 1170. Each of the screens illustrated in FIGS. 11B–E presents information similar to that illustrated in FIG. 11A.

In an alternative embodiment of the invention (not shown), other links are included on the auction server main page 802. For example, a "Coming Soon" or "Forthcoming" Auctions links causes the system to display a list of all the auctions that have a status of 'Forthcoming'. This allows the participant to see into the future any planned auctions. A second example is the Feature Auctions link. These are auctions that have been flagged as 'special'. These maybe auctions being promoted being of a season, such as 'The Christmas Special', or any other event related sale. A third example is a "Today's Feature" link, which when invoked, causes the system to display the special auction item of the day.

Figure 12A:
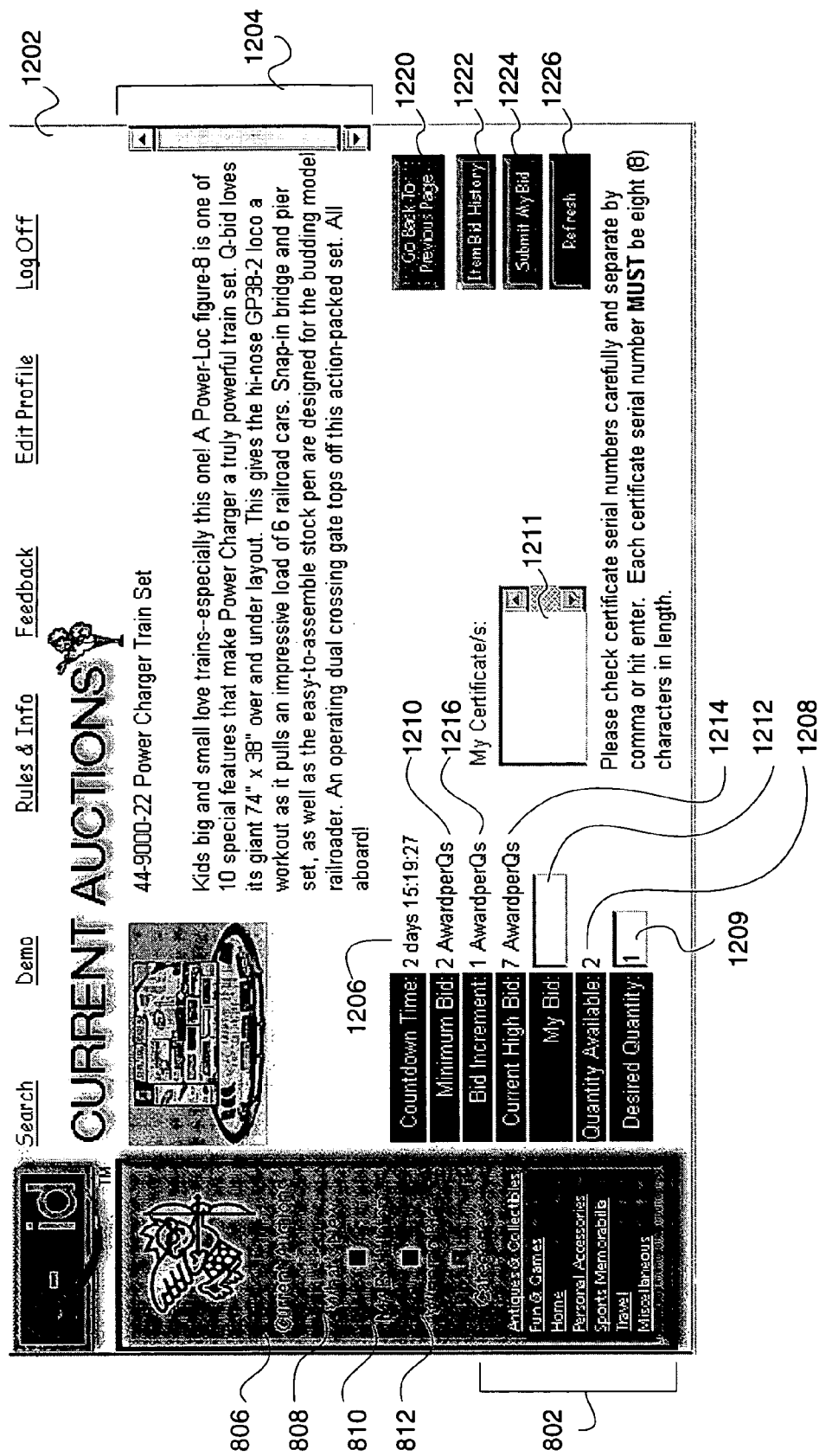

FIGS. 12A–12D illustrate item bid screens according to various embodiments of the invention. FIG. 12A illustrates an exemplary auction item page 1202 according to an embodiment of the invention. In this embodiment, auction item page 1202 displays further details regarding a single item selected from the items displayed on an auction page, such as those items displayed in FIGS. 8–11. Auction item page 1202 includes description 1204, end date field 1206, bid start amount field 1210, bid increment field 1216, current high bid 1214, quantity available 1208, desired quantity 1209, bid amount field 1212 and certificate numbers field 1211. In addition, a picture of the item can be displayed on auction item page 1202.

Description 1204 comprises text describing the item to be auctioned. This text is read from the auction database, and can include details regarding features, specifications, model numbers, warranty information, etc. about the selected item.

End time field 1206 displays the date and time that the auction will close for the selected item.

Bid start amount field 1210 displays the initial bid amount that was established when the item first came up for auction (i.e. the auction start time). This amount is read from the auction database, and converted to a value based on the program that the participant is participating in.

Bid increment 1216 displays the minimum amount that any new bid must add to the current high bid 1214.

Bid amount field 1212 is an input field providing a means for a participant to submit a bid for the item. In one embodiment of the invention, the bid amount field 1212 is a drop down box containing five potential bid amounts to be selected by the participant. The bid amounts displayed are calculated using the minimum bid increment field 1216 for the item as stored in the auction database. The minimum bid increment field is converted so that the bid amounts are in terms of the media type and denomination for the program that the participant is participating in. Those of skill in the art will appreciate that other input mechanisms besides a drop down box could be used to input bid amounts, and are within the scope of the invention. For example, a text field could be used in which the participant enters a new bid amount.

Quantity available 1208 indicates the quantity of the item available for sale via the auction.

Desired quantity 1209 is an input field indicating the quantity of the item that the user desires to obtain via the auction. The desired quantity 1209 can be any number up to the quantity available 1208.

Certificate numbers field 1211 is an input field in which a user provides a list of certificate numbers of certificates representing reward media that the user will redeem in exchange for the auction item should the user's bid be the winning bid when the auction closes.

After entering a bid amount, the user can cause the bid to be submitted to the auction server by clicking on a "submit" button 1224. Other buttons can exist on the screen 1202. For example a "previous" button 1220 causes cancellation of the current bid and the previous screen to be presented to the user. Refresh button 1226 causes the screen to be refreshed to reflect any potential updates to the current high bid 1214 to be displayed to the user. Item bid history 1222 causes a bid history to be displayed for a particular auction.

Figure 12B:
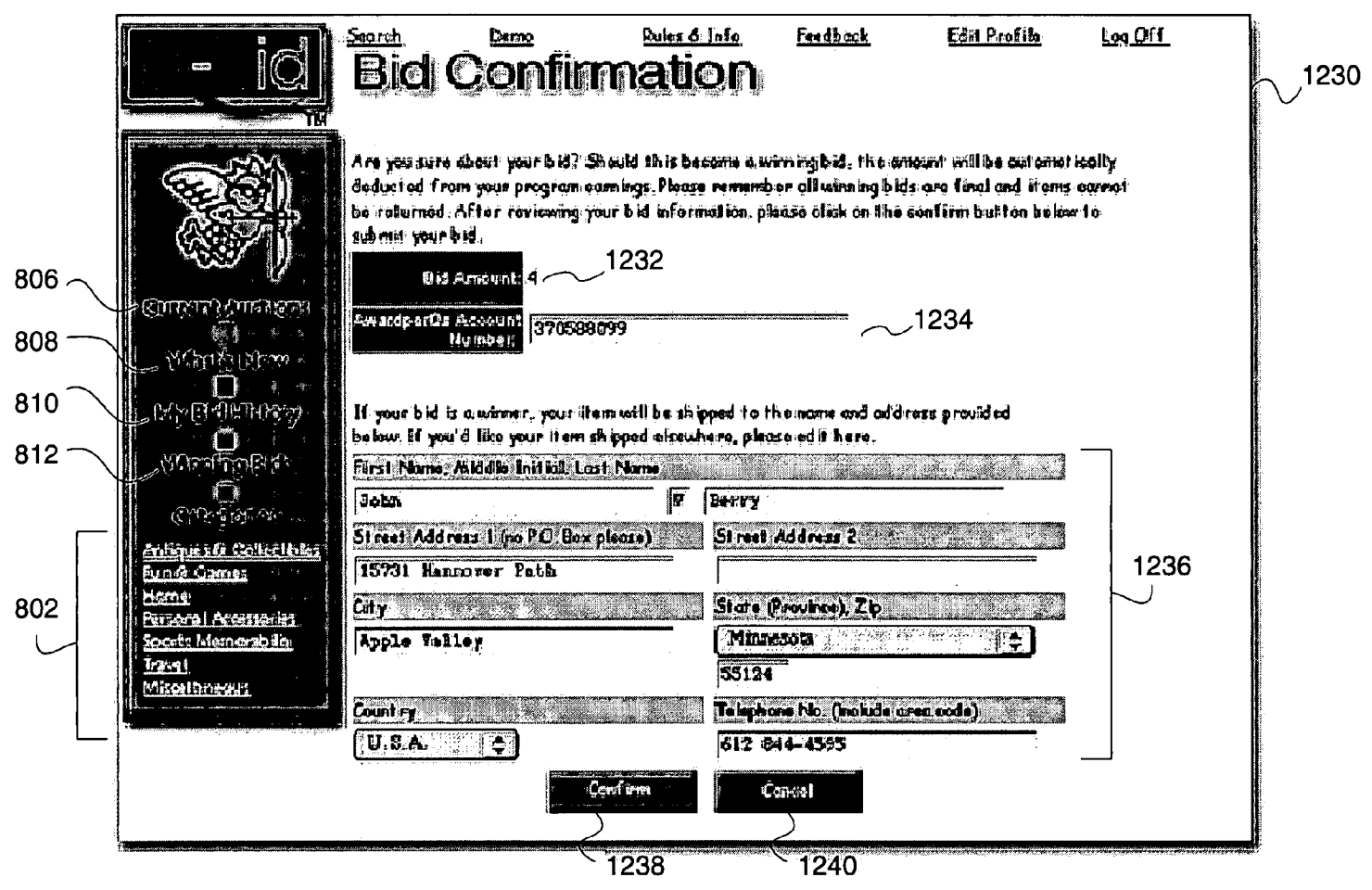

An exemplary bid confirmation screen 1230 is illustrated in FIG. 12B. Bid confirmation screen 1230 is presented in response to pressing the submit button 1224 on screen 1202. As shown, screen 1230 includes bid amount 1232, media account number 1234, and shipping address 1236. Bid amount 1232 is the amount submitted in bid amount field 1212 (FIG. 12A). Media account number 1234 is the reward media account number to be used to satisfy the bid amount. The account number can be an identifier for an electronic bank account of accumulated reward media units, or it can be a certificate number for a paper certificate that represents reward media units. Shipping address 1236 is an address that the auction item should be shipped to should the participant submit the winning bid. The address details can be defaulted to those provided during user registration, or the user can override the default by entering new information in fields 1236. The bid can be confirmed via button 1238, or cancelled via button 1240.

Figure 12C:
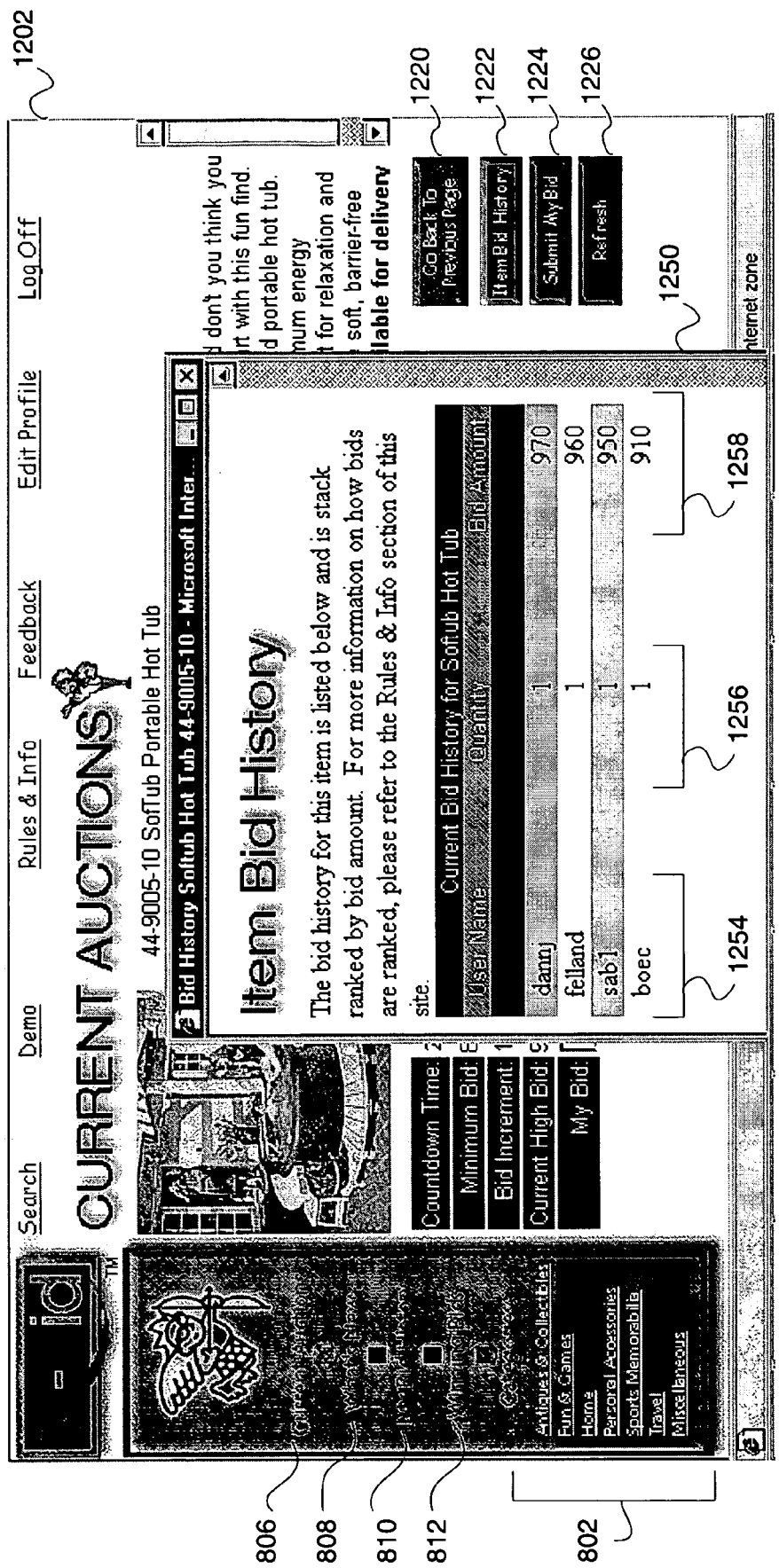

An item bid history screen 1250 is illustrated in FIG. 12C. Item bid history screen 1250 is displayed in response to pressing the item bid history button 1222. In one embodiment of the invention, item bid history screen includes a list of all users that submitted a bid for the item. Each item in the list includes a user name 1254, a quantity field 1256, and a bid amount 1258. User name 1254 is the user identifier for the participant that has submitted a bid for the item. Quantity field 1256 is the quantity desired by the bidder. Bid amount 1258 is the amount bid by the participant.

Figure 12D:
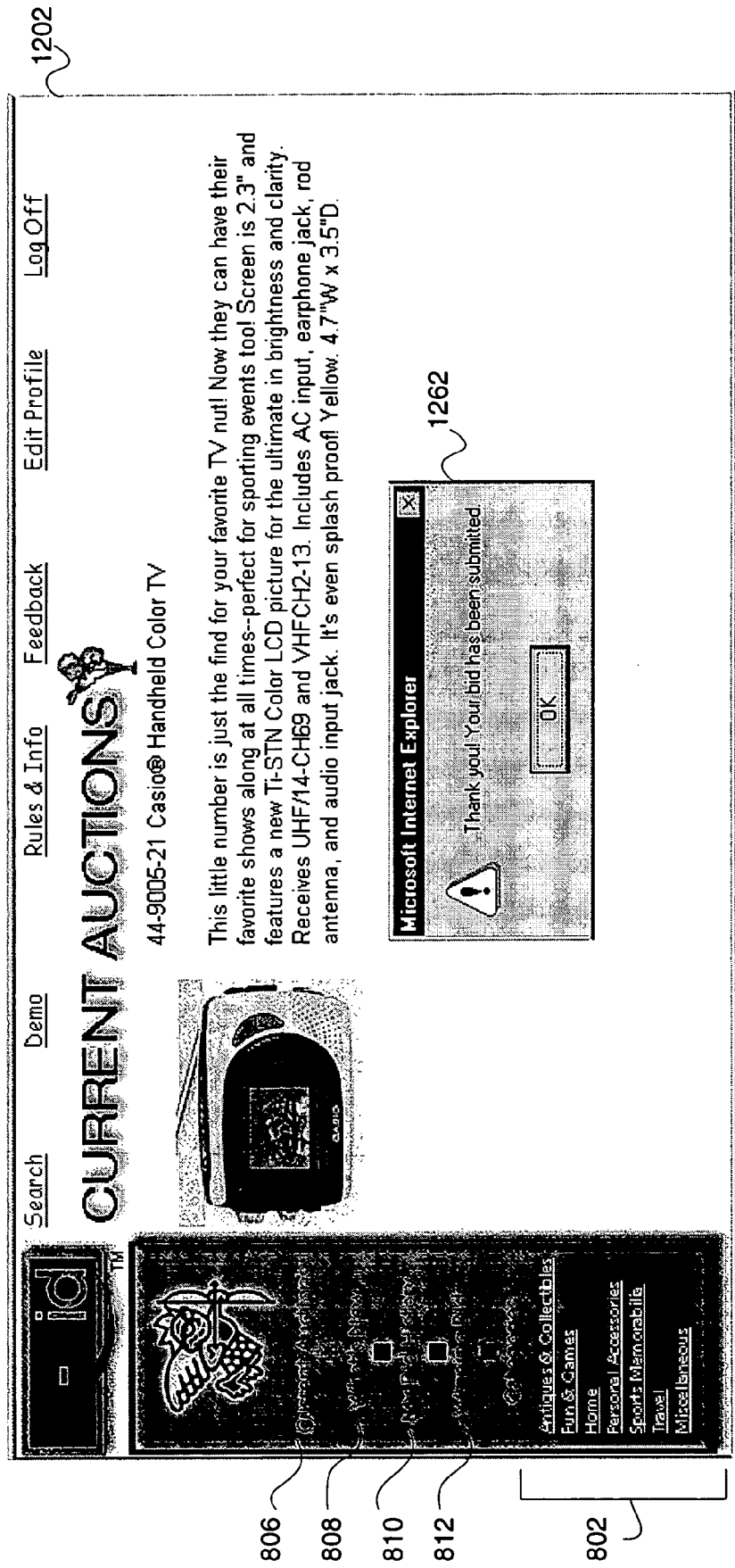

A bid confirmation tab 1262 is illustrated in FIG. 12D. Bid confirmation screen includes bid confirmation tab 1262. This screen is displayed in response to confirming a bid on screen 1230 via button 1238 (FIG. 12B).

Figure 13A:
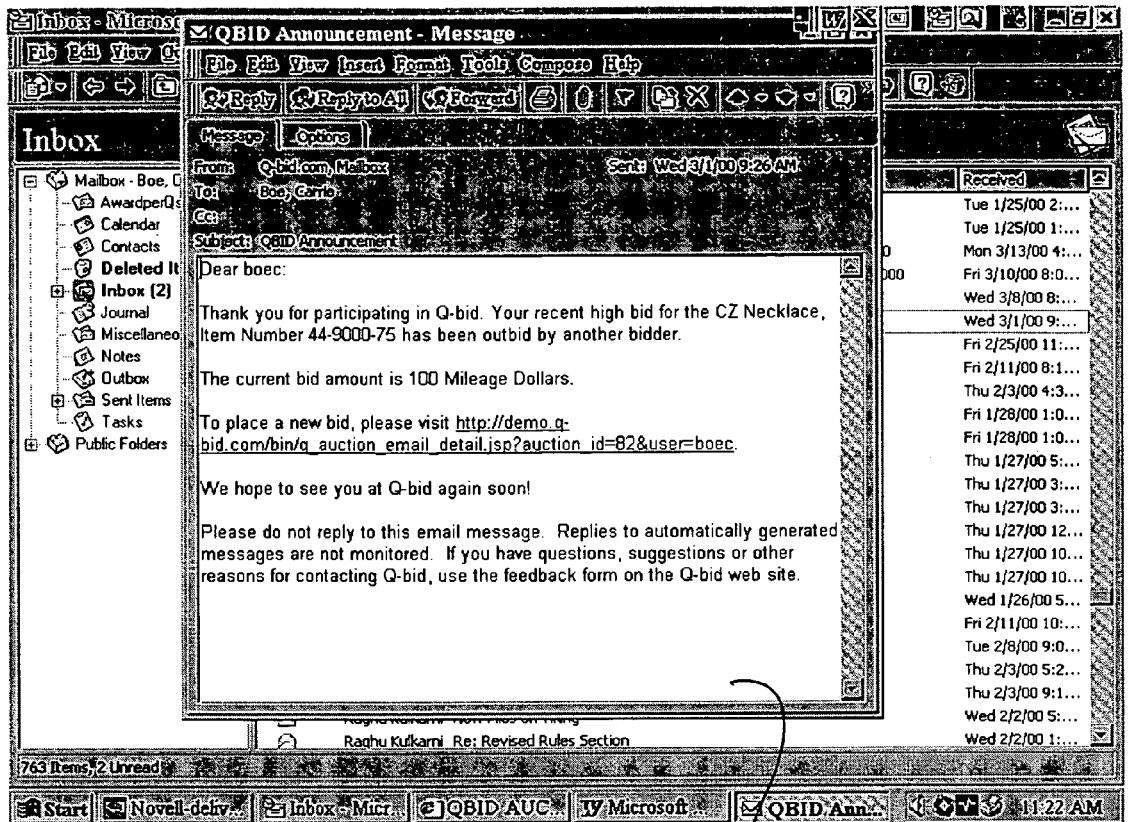
FIGS. 13A–13C illustrate exemplary bid notification items according to an embodiment of the invention.

FIG. 13A illustrates an exemplary "outbid" notification for English auctions, according to an embodiment of the invention. In this embodiment, a participant is sent an e-mail 1301 if they have submitted a bid for an item, and another participant subsequently submits a higher bid. The e-mail is sent to the e-mail address provided during the registration process. The information contained in the e-mail includes an auction number identifying the auction, the item name, and the current high bid amount. The current high bid amount is expressed in terms of the media and denomination associated with the program that the participant is participating in. In some embodiments of the invention, there is a hyperlink within the e-mail notification that provides a link to the specific auction for which the participant was outbidded.

Figure 13B:
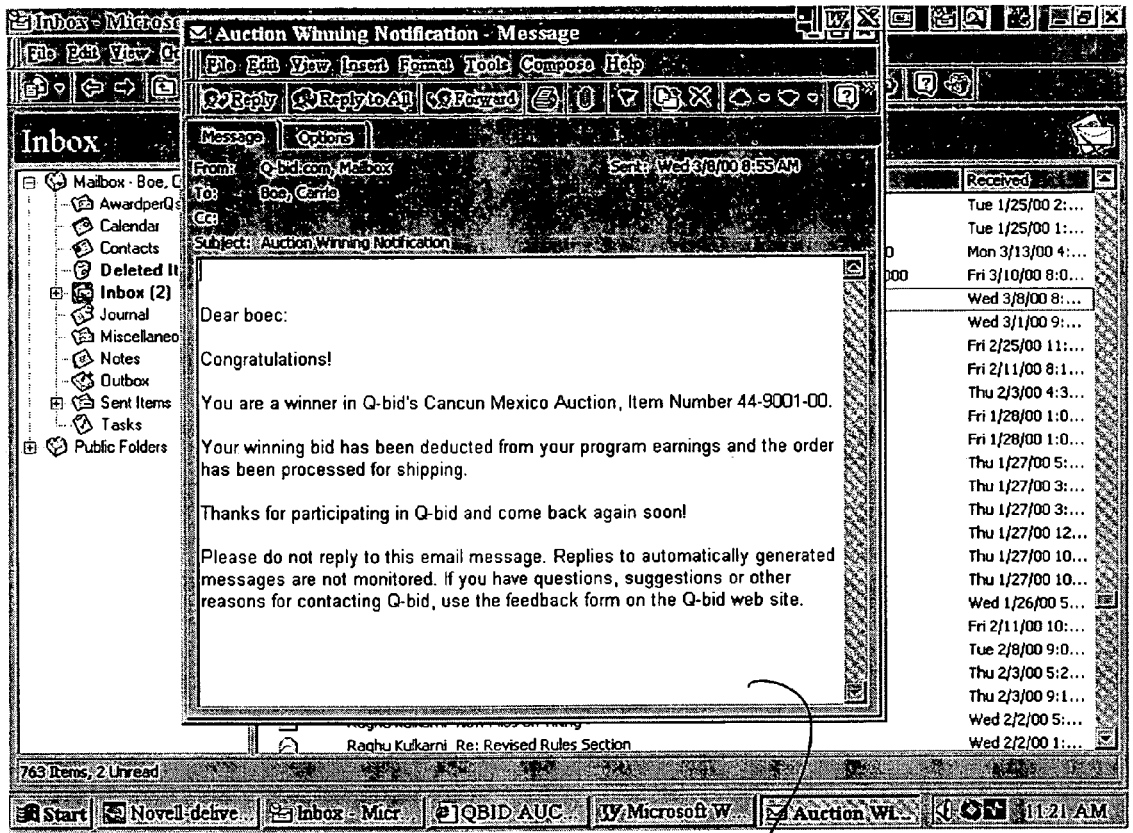
Figure 13C:
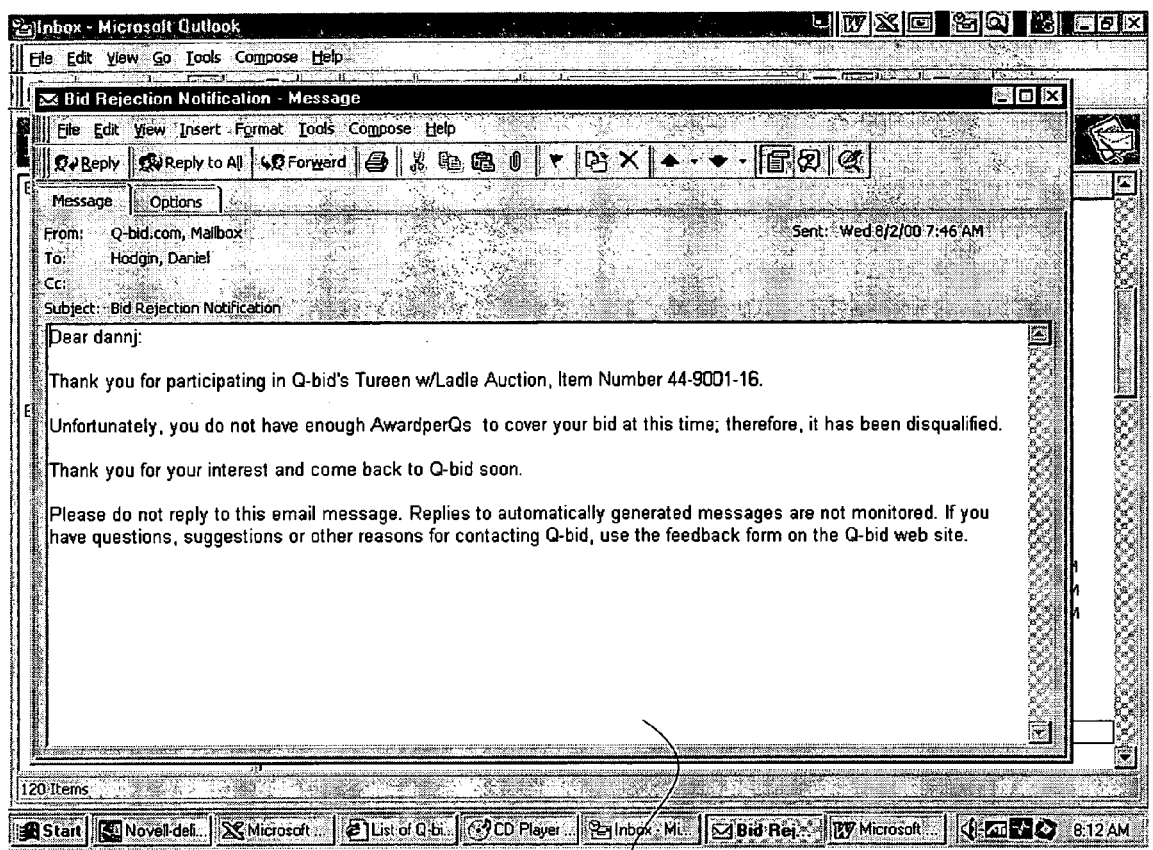

FIG. 13B illustrates an exemplary winner notification according to an embodiment of the invention. In this embodiment, the participant is sent an electronic mail (e-mail) message 1302 containing data regarding the winning bid. The e-mail is sent to the e-mail address provided during the registration process. The information contained in the e-mail includes an auction number identifying the auction, the item name, and states the funds have been deducted FIG. 13C is an exemplary notification that is sent if the participant is a winner of an auction, but can not be deemed the winner for a lack of sufficient funds, or other qualifying reason, the recipient will receive a rejection e-mail notification 1303. This rejection e-mail contains the reason the participant's winning bid could not be accepted.

CONCLUSION

A computerized incentive system with an Internet auction component has been described. The embodiments of the invention provide advantages over previous systems. The system provides an auction environment in which incentive reward points can be used to bid on items. The use of incentive award points is advantageous, because a participant is more likely to bid when they know that they will not have to part with real money. In addition, participants are more likely to bid, because the odds of submitting a winning bid are increased relative to previous Internet based auctions. This is because the domain of possible participants is limited to those that have been invited to participate by a sponsor. Finally, the system provides the advantage that participants in multiple programs, or users in multiple countries, can bid on items. The amounts displayed and bid are always in terms of the media and denominations that are relevant to the participants particular program or country.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention.

For example, the systems and methods described above have used incentive reward points or media as medium of exchange, however the invention is not so limited. For example, the systems and methods of the invention can apply equally well to an auction system in which each participant sees the current bid amounts in a local currency. The auction system automatically converts the local currency to a uniform "auction" currency in the same manner as described above with respect to the conversion of reward points or media.

The terminology used in this application is meant to include all of these environments. It is to be understood that the above description is intended to be illustrative, and not restrictive. Many other embodiments will be apparent to those of skill in the art upon reviewing the above description. Therefore, it is manifestly intended that this invention be limited only by the following claims and equivalents thereof.

What is claimed is:

1. A computerized auction system comprising:
a database of auction items available for purchasing in accordance with a set of rules associated with an auction, said database including at least one auction item and program data for a plurality of incentive reward programs, the at least one auction item having a bid value, said program data including a program incentive reward media type for each of the plurality of incentive reward programs;
an auction server operative to receive a request from a participant of a plurality of participants for displaying the auction items, said plurality of participants including at least two participants from different incentive reward programs, said participant associated with one of the plurality of incentive reward programs; and
wherein the auction server reads the auction item, the bid value, and the program data, and converts the bid value to a display value having the program incentive reward media type of the incentive reward program associated with the participant.

2. The computerized system of claim 1, wherein the program incentive reward media type is selected from the group consisting of frequent user points, frequent flyer miles, and paper certificates.

3. The computerized system of claim 1, further comprising a fulfillment component operative to determine the winning bid for the auction item and to arrange for delivery of an actual item associated with the auction item.

4. The computerized system of claim 3, wherein the auction item is a service.

5. A computerized method for displaying auction bid data for an auction item, the method comprising:
receiving a request to display bid data from a participant of a plurality of participants;
reading a program incentive reward media type from a database containing program data for a plurality of incentive reward programs, the program data determined based on the incentive reward program associated with the participant;
calculating a display amount in the program incentive reward media type by converting the bid data to the program incentive reward media type; and
displaying the display amount;
wherein the plurality of participants includes at least two participants from different incentive reward programs.

6. A computerized method for updating auction bid data in a computer system, the method comprising:
receiving from a participant of a plurality of participants a first bid amount for an auction item, the auction item having an item media type;
reading a program incentive reward media type from a database containing program data for a plurality of incentive reward programs, the program data determined based on an incentive reward program associated with the participant;
calculating a second bid amount by converting the first bid amount in the program incentive reward media type to the item media type; and
updating a current bid amount for the auction item with the second bid amount;
wherein the plurality of participants includes at least two participants from different incentive reward programs.

7. A computer readable medium having computer executable instructions for performing a method for displaying auction bid data for an auction item, the method comprising:
receiving a request to display bid data from a participant of a plurality of participants;
reading a program incentive reward media type from a database containing program data for a plurality of incentive reward programs, the program data determined based on the incentive reward program associated with the participant;
calculating a display amount in the program incentive reward media type by converting the bid data to the program incentive reward media type; and
displaying the display amount;
wherein the plurality of participants includes at least two participants from different incentive reward programs.

8. A computer readable medium having computer executable instructions for performing method for updating auction bid data in a computer system, the method comprising:
receiving from a participant of a plurality of participants a first bid amount for an auction item, the auction item having an item media type;
reading a program incentive reward media type from a database containing program data for a plurality of incentive reward programs, the program data determined based on an incentive reward program associated with the participant;
calculating a second bid amount by converting the first bid amount in the program incentive reward media type to the item media type; and
updating a current bid amount for the auction item with the second bid amount;
wherein the plurality of participants includes at least two participants from different incentive reward programs.

9. The computerized method of claim 5, wherein the program incentive reward media type is selected from the group consisting of frequent user points, frequent flyer miles, and paper certificates.

10. The computerized method of claim 6, wherein the program incentive reward media type is selected from the group consisting of frequent user points, frequent flyer miles, and paper certificates.

11. The computer readable medium of claim 7, wherein the program incentive reward media type is selected from the group consisting of frequent user points, frequent flyer miles, and paper certificates.

12. The computer readable medium of claim 8, wherein the program incentive reward media type is selected from the group consisting of frequent user points, frequent flyer miles, and paper certificates.

* * * * *